United States Patent
Yamamoto

(10) Patent No.: US 11,633,759 B2
(45) Date of Patent: Apr. 25, 2023

(54) METHOD FOR FORMING MULTILAYER COATING FILM

(71) Applicant: KANSAI PAINT CO., LTD., Hyogo (JP)

(72) Inventor: Hiroyuki Yamamoto, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 0 days.

(21) Appl. No.: 17/276,653

(22) PCT Filed: Jul. 31, 2019

(86) PCT No.: PCT/JP2019/030053
§ 371 (c)(1),
(2) Date: Mar. 16, 2021

(87) PCT Pub. No.: WO2020/059311
PCT Pub. Date: Mar. 26, 2020

(65) Prior Publication Data
US 2021/0268540 A1 Sep. 2, 2021

(30) Foreign Application Priority Data
Sep. 19, 2018 (JP) .............................. JP2018-174932

(51) Int. Cl.
*B05D 7/00* (2006.01)
*B05D 1/36* (2006.01)
*B05D 3/02* (2006.01)
*B05D 7/24* (2006.01)

(52) U.S. Cl.
CPC ............. *B05D 7/572* (2013.01); *B05D 1/36* (2013.01); *B05D 3/0254* (2013.01); *B05D 7/24* (2013.01); *B05D 2400/00* (2013.01); *B05D 2401/20* (2013.01); *B05D 2451/00* (2013.01); *B05D 2502/00* (2013.01)

(58) Field of Classification Search
None
See application file for complete search history.

(56) References Cited

U.S. PATENT DOCUMENTS

| 5,633,037 | A | 5/1997 | Mayer |
| 10,508,212 | B2 | 12/2019 | Takayama et al. |
| 2008/0226891 | A1* | 9/2008 | Chiga .................. C08G 18/792 428/221 |
| 2015/0218405 | A1 | 8/2015 | Iwata et al. |
| 2020/0010720 | A1 | 1/2020 | Takeno et al. |
| 2020/0048492 | A1 | 2/2020 | Imai |

FOREIGN PATENT DOCUMENTS

| JP | 2002003568 | A | | 1/2002 |
| JP | 2004-66034 | A | | 3/2004 |
| JP | 2012-000568 | A | | 1/2012 |
| JP | 2012-187541 | A | | 10/2012 |
| JP | 2016-112522 | A | | 6/2016 |
| JP | 2016112522 | A | * | 6/2016 |
| WO | 2014/045657 | A1 | | 3/2014 |
| WO | 2015/087932 | A1 | | 6/2015 |
| WO | 2016/121239 | A1 | | 8/2016 |
| WO | 2018/135209 | A1 | | 7/2018 |
| WO | 2018163953 | A1 | | 9/2018 |

OTHER PUBLICATIONS

Duranate Product Information Brochure—evidentiary reference.*
International Search Report dated Nov. 5, 2019 issued in corresponding PCT/JP2019/030053 application (2 pages).
English ABSTRACT of JP 2012-187541 A published Oct. 4, 2012.

* cited by examiner

*Primary Examiner* — Michael P. Rodriguez
(74) *Attorney, Agent, or Firm* — Millen, White, Zelano and Branigan, P.C.; Harry B. Shubin

(57) ABSTRACT

Provided is a method for forming a multilayer coating film, the method being capable of forming a multilayer coating film having excellent chipping resistance, adhesion, and finished appearance. The method for forming a coating film uses a 3-coat and 1-bake system in which a three-layered multilayer coating film obtained by sequentially applying a first coloring paint (X), a second coloring paint (Y), and a clear coating paint (Z) onto an object to be coated is heated and cured at the same time, wherein the first coloring paint (X) and the second coloring paint (Y) contain a hydroxyl group-containing resin, and the clear coating paint (Z) contains a hydroxyl group-containing acrylic resin (a) and an aliphatic triisocyanate compound (b1) having a molecular weight within a specific range.

8 Claims, No Drawings

METHOD FOR FORMING MULTILAYER COATING FILM

FIELD

The present invention relates to a method for forming a multilayer coating film by a 3-coat, 1-bake system in which a first coloring coating material, a second coloring coating material and a clear coating material are coated in that order on an article to be coated, and the obtained 3-layer multilayer coating film is simultaneously heat cured.

BACKGROUND

Recent years have seen increasingly active development toward shortening baking and curing steps and reducing the number steps for coating of industrial products such as automobile bodies, from the viewpoint of energy efficiency and reducing environmental load.

One way of reducing the number of steps for coating of automobile bodies is to reduce the step of baking and curing. Specifically, the conventional process has been carried out by a method of electrodeposition on a steel sheet, followed by baking and curing, and then formation of a multilayer coating film by a three-coat, two-bake system in which the series of intercoat material application→baking/curing→base coat material application→preheating→clear coating material application→baking/curing is carried out in that order, but in recent years a "3-coat, 1-bake system" has been developed wherein baking of three layers (intercoat material, base coat material and clear coating material) is carried out simultaneously, eliminating the baking and curing step after the intercoat material application.

In order to reduce the steps for coating of automobile parts as well, while the conventional process has been carried out by a method of application of a primer coating material onto a plastic substrate, followed by formation of a multilayer coating film by a three-coat, two-bake system in which the series of baking/curing→base coat material application-→preheating→clear coating material application→baking/curing is carried out in that order, similarly in recent years a "3-coat, 1-bake system" has been developed wherein baking of three layers (primer coating material, base coat material and clear coating material) is carried out simultaneously, thus eliminating the baking and curing step after the primer coating material application.

From the viewpoint of achieving further energy savings, there has been a demand in recent years to lower the heating temperature for the baking and curing step in such a 3-coat, 1-bake system.

When the heating temperature for the baking and curing step in a 3-coat, 1-bake system is lowered, however, it has often been impossible to obtain a multilayer coating film having sufficient chipping resistance, adhesiveness and finished outer appearance.

PTL 1 describes a method for forming a multilayer coating film by a 3-coat, 1-bake system using a first aqueous base coating material, a second aqueous base coating material and a clear coating material, wherein the first aqueous base coating material is a coating material comprising an acrylic emulsion resin, an oxazoline group-containing compound, a dispersing pigment-dispersed paste and a thickening agent, and teaches that when the total amount of volatile basic substances per 1 $mm^2$ unit area of the coated film formed by the first aqueous base coating material, second aqueous base coating material and clear coating material before heat curing is $7 \times 10^{-6}$ mmol or lower, it is possible to inhibit yellowing of the coating film and to form a coating film with excellent water resistance, chipping resistance, low-temperature curability, adhesion for polypropylene members and outer appearance. However, the chipping resistance, adhesiveness and finished outer appearance have often been inadequate even with coating films formed by this multilayer coating film forming method.

PTL 2 describes a method for forming a multilayer coating film by application of an aqueous first coloring coating material, an aqueous second coloring coating material and a clear coating material in that order on an article to be coated, and it is stated that when the aqueous first coloring coating material used is a coating material comprising (A) an aqueous film-forming resin and (B) a specific blocked polyisocyanate compound, and the clear coating material used is a coating material comprising (K) a hydroxyl group-containing acrylic resin with a hydroxyl value in a specified range, (L) a polyisocyanate compound and (M) an organometallic catalyst comprising (M1) a specified range of a metal compound and (M2) an amidine compound, the method makes it possible to obtain a multilayer coating film with excellent curability, water resistance, adhesion and finished outer appearance at low temperature and in a short period of time. However, the chipping resistance have often been inadequate with coating films formed by this multilayer coating film forming method.

CITATION LIST

Patent Literature

[PTL 1] Japanese Unexamined Patent Publication No. 2004-66034

[PTL 2] International Patent Publication No. 2014/045657

SUMMARY

Technical Problem

It is an object of the invention to provide a method for forming a multilayer coating film by a 3-coat, 1-bake system in which a first coloring coating material, a second coloring coating material and a clear coating material are applied in that order onto an article to be coated and the obtained 3-layer multilayer coating film is simultaneously heat cured, whereby it is possible to form a multilayer coating film with excellent chipping resistance, adhesiveness and finished outer appearance, and in particular to provide a method for forming a multilayer coating film that allows a multilayer coating film with excellent chipping resistance, adhesiveness and finished outer appearance to be formed even when the heating temperature in the heat curing step of the 3-coat, 1-bake system has been relatively lowered.

Solution to Problem

As a result of much diligent research toward achieving the object stated above, the present inventors have completed this invention upon finding that the object can be achieved with a 3-coat, 1-bake system in which a first coloring coating material (X), a second coloring coating material (Y) and a clear coating material (Z) are applied in that order onto an article to be coated and the obtained 3-layer multilayer coating film is simultaneously heat cured, if the first coloring coating material (X) and the second coloring coating material (Y) contain a hydroxyl group-containing resin and the clear coating material (Z) contains a hydroxyl group-containing acrylic resin (a) and an aliphatic triisocyanate compound (b1) having a molecular weight within a specified range.

According to the invention there is provided a method for forming a multilayer coating film that includes the following embodiments.

1. A method for forming a multilayer coating film in which the following steps (1) to (4) are carried out in order on an article to be coated:

step (1): a step of applying a first coloring coating material (X) onto an article to be coated to form a first coloring coating film, step (2): a step of applying a second coloring coating material (Y) onto the first coloring coating film formed in step (1), to form a second coloring coating film, step (3): a step of applying a clear coating material (Z) onto the second coloring coating film formed in step (2) to form a clear coating film, and step (4): a step of heat curing the first coloring coating film, the second coloring coating film and the clear coating film formed in steps (1) to (3) all at once, wherein:

the first coloring coating material (X) contains a hydroxyl group-containing resin (x1), the second coloring coating material (Y) contains a hydroxyl group-containing resin (y1), the clear coating material (Z) contains a hydroxyl group-containing acrylic resin (a) and a polyisocyanate compound (b), and the polyisocyanate compound (b) contains an aliphatic triisocyanate compound (b1) with a molecular weight in the range of 200 to 350, as at least one of its types.

2. The method for forming a multilayer coating film according to 1., wherein the first coloring coating material (X) further contains a flat pigment.

3. The method for forming a multilayer coating film according to 1. or 2., wherein the first coloring coating material (X) and/or the second coloring coating material (Y) further contain a blocked polyisocyanate compound.

4. The method for forming a multilayer coating film according to any one of 1. to 3., wherein the first coloring coating material (X) and the second coloring coating material (Y) are aqueous coating materials.

5. The method for forming a multilayer coating film according to any one of 1. to 4., wherein the proportion of the aliphatic triisocyanate compound (b1) in the polyisocyanate compound (b) of the clear coating material (Z) is in the range of 10 to 60 mass %.

6. The method for forming a multilayer coating film according to any one of 1. to 5., wherein the polyisocyanate compound (b) in the clear coating material (Z) contains a polyisocyanate compound (b2) with a molecular weight in the range of 500 to 2000, as at least one of its types.

7. The method for forming a multilayer coating film according to any one of 1. to 6., wherein the equivalent ratio (NCO/OH) between the total moles of isocyanate groups of the polyisocyanate compound (b) and the total moles of hydroxyl groups of the hydroxyl group-containing acrylic resin (a) in the clear coating material (Z) is in the range of 1.3 to 2.5.

8. The method for forming a multilayer coating film according to any one of 1. to 7., wherein the heating temperature in step (4) is in the range of 60° C. to 120° C.

Advantageous Effects of Invention

With the method of forming a coating film according to the invention it is possible to form a multilayer coating film with excellent chipping resistance, adhesiveness and finished outer appearance, by a 3-coat, 1-bake system in which a first coloring coating material, a second coloring coating material and a clear coating material are applied in that order onto an article to be coated and the obtained 3-layer multilayer coating film is simultaneously heat cured. In the 3-coat, 1-bake system it is possible to form a multilayer coating film with excellent chipping resistance, adhesiveness and finished outer appearance, even when the heating temperature in the baking and curing step has been relatively lowered.

DESCRIPTION OF EMBODIMENTS

Each of the steps in the method for forming a multilayer coating film of the invention will now be further described, in order.

Step (1)

In the method for forming a multilayer coating film of the invention, first a first coloring coating material (X) is applied onto an article to be coated to form a first coloring coating film.

Article to be Coated

The article onto which the first coloring coating material (X) is to be applied is not particularly restricted. Examples for the article to be coated include external platings of automobile bodies of passenger vehicles, trucks, motorcycles and buses; automobile parts such as bumpers; and external platings of consumer electric products such as cellular phones or audio devices. Preferred among these are external platings of automobile bodies, and automobile parts.

The material of the article to be coated is also not particularly restricted. Examples include metal materials such as iron, aluminum, brass, copper, tin, stainless steel, galvanized steel and alloyed zinc (such as Zn—Al, Zn—Ni and Zn—Fe)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, as well as mixtures of such resins; plastic materials such as fiber-reinforced plastic (FRP); inorganic materials such as glass, cement and concrete; wood materials; and fiber materials such as paper and fabrics. Metal materials and plastic materials are preferred among these.

The article to be coated may be an article that is a metal material or has a metal surface, such as that of a car body that has been formed from it, that has been surface-treated by phosphate treatment, chromate treatment or complex oxide treatment, or that further has a coating film formed over it.

Articles to be coated having coating films formed include base materials that have been surface-treated as necessary, with primer coating films formed over them. Primer coating films are usually formed to impart corrosion resistance, or adhesiveness with base materials, or concealing properties on irregular base material surfaces (also known as "base layer concealing properties"). The primer coating material used to form a primer coating film may be any one that is already known. On a conductive base material such as metal, for example, it is preferred to use a cation electrodeposition coating or anion electrodeposition coating from the viewpoint of the corrosion resistance of the formed multilayer coating film, while it is preferred to use a cation electrodeposition coating from the viewpoint of chipping resistance and adhesiveness.

The article to be coated may also be a combination of such a metal material and a plastic material.

The primer coating material may be cured by means such as heating or blasting after its application, or it may be dried to an extent that avoids curing. When a cation electrodeposition coating or anion electrodeposition coating is used as the primer coating material, it is preferred to carry out heating after application of the primer coating for curing of the primer coating film, in order to prevent layer mixing between the primer coating film and the coating film formed afterwards on the primer coating film (interlayer mixing), and to form a multilayer coating film with an excellent outer appearance.

First Coloring Coating Material (X)

The first coloring coating material (X) of the invention is a coating composition containing a hydroxyl group-containing resin (x1).

The form of the first coloring coating material (X) is not particularly restricted, and it may be the form of an aqueous coating material, organic solvent-based coating material or solventless coating material.

For the present purpose, "aqueous coating material" is a term used in contrast to "organic solvent-based coating material", and generally refers to a coating material having a coating film-forming resin or pigment dispersed and/or dissolved in water or a medium composed mainly of water (an aqueous medium). When the first coloring coating material (X) is an aqueous coating material, the water content in the first coloring coating material (X) is in the range of 10 to 90 mass %, preferably 20 to 80 mass % and more preferably 30 to 70 mass %. An organic solvent-based coating material is a coating material wherein the solvent used contains substantially no water, or wherein all or virtually all of the solvent used is an organic solvent.

According to the invention, the first coloring coating material (X) is preferably an aqueous coating material from the viewpoint of reducing the environmental load.

Hydroxyl Group-Containing Resin (x1)

The hydroxyl group-containing resin (x1) is a resin having at least one hydroxyl group in the molecule. Examples for the hydroxyl group-containing resin (x1) include resins such as acrylic resins, polyester resins, polyurethane resins, polyolefin resins, polyether resins, polycarbonate resins, epoxy resins and alkyd resins, which have hydroxyl groups. These may be used alone or in combinations of two or more.

The content of the hydroxyl group-containing resin (x1) in the first coloring coating material (X) is in the range of 1 to 100 mass %, preferably 10 to 90 mass % and more preferably 20 to 80 mass %, based on the total amount of the solid resin content in the first coloring coating material (X).

According to the invention, the solid resin content of the coating material includes a compound that is reactive with the resin component in the coating material. For example, when the first coloring coating material (X) contains the hydroxyl group-containing resin (x1) and a crosslinking agent (x2) that is reactive with the hydroxyl group-containing resin (x1), the solid resin content in the first coloring coating material (X) includes the solid content of the hydroxyl group-containing resin (x1) and the solid content of the crosslinking agent (x2).

From the viewpoint of the chipping resistance, adhesiveness and finished outer appearance of the multilayer coating film that is to be formed, the hydroxyl group-containing resin (x1) used may be a hydroxyl group-containing acrylic resin (x11), a hydroxyl group-containing polyester resin (x12) and/or a hydroxyl group-containing polyurethane resin (x13). When the article to be coated is a plastic material, the hydroxyl group-containing resin (x1) used is preferably a hydroxyl group-containing polyolefin resin (x14) from the viewpoint of the chipping resistance and adhesiveness of the multilayer coating film that is formed.

Hydroxyl Group-Containing Acrylic Resin (x11)

The hydroxyl group-containing acrylic resin (x11) can be produced, for example, by copolymerizing a hydroxyl group-containing polymerizable unsaturated monomer and another polymerizable unsaturated monomer that is copolymerizable with the hydroxyl group-containing polymerizable unsaturated monomer, by a known method such as a solution polymerization method in an organic solvent or an emulsion polymerization method in water.

The hydroxyl group-containing polymerizable unsaturated monomer is a compound having one or more hydroxyl and polymerizable unsaturated bonds in the molecule. Specific examples for the hydroxyl group-containing polymerizable unsaturated monomer include monoesterified products of (meth)acrylic acid and dihydric alcohols of 2 to 8 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of the monoesterified products of (meth) acrylic acid and dihydric alcohols of 2 to 8 carbon atoms; N-hydroxymethyl (meth)acrylamide; allyl alcohols, and (meth)acrylates having polyoxyethylene chains with hydroxyl groups at the molecular ends. However, monomers qualifying as "(xvii) polymerizable unsaturated monomers with an ultraviolet absorbing functional group" as mentioned below are to be defined as "other polymerizable unsaturated monomers that are copolymerizable with hydroxyl group-containing polymerizable unsaturated monomers", and are excluded from "hydroxyl group-containing polymerizable unsaturated monomers" for the invention, even if they are hydroxyl-containing monomers. Any of these may be used alone or in combinations of two or more.

Examples of other polymerizable unsaturated monomers that are copolymerizable with the hydroxyl group-containing polymerizable unsaturated monomer and that may be used include the following monomers (i) to (xx). These polymerizable unsaturated monomers may be used alone or in combinations of two or more.

(i) Alkyl or cycloalkyl (meth)acrylates: For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, isostearyl (meth) acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate and the like.

(ii) Polymerizable unsaturated monomers with isobornyl groups: Isobornyl (meth)acrylate and the like.

(iii) Polymerizable unsaturated monomers with adamantyl groups: Adamantyl (meth)acrylate and the like.

(iv) Polymerizable unsaturated monomers with tricyclodecenyl groups: Tricyclodecenyl (meth)acrylate and the like.

(v) Aromatic ring-containing polymerizable unsaturated monomers: Benzyl (meth)acrylate, styrene, α-methylstyrene, vinyltoluene and the like.

(vi) Polymerizable unsaturated monomers with alkoxysilyl groups: Vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane and the like.

(vii) Polymerizable unsaturated monomers with fluorinated alkyl groups: Perfluoroalkyl (meth)acrylates such as perfluorobutylethyl (meth)acrylate and perfluorooctylethyl (meth)acrylate, fluoroolefins, and the like.
(viii) Polymerizable unsaturated monomers with photopolymerizable functional groups such as maleimide.
(ix) Vinyl compounds: N-Vinylpyrrolidone, ethylene, butadiene, chloroprene, vinyl propionate, vinyl acetate and the like.
(x) Carboxyl group-containing polymerizable unsaturated monomers: (meth)acrylic acid, maleic acid, crotonic acid, β-carboxyethyl (meth)acrylate and the like.
(xi) Nitrogen-containing polymerizable unsaturated monomers: (Meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis(meth)acrylamide, and glycidyl (meth)acrylate and amine compound addition products and the like.
(xii) Polymerizable unsaturated monomer with two or more polymerizable unsaturated groups in the molecule: allyl (meth)acrylate, ethylene glycol di(meth)acrylate, 1,4-butane di(meth)acrylate, neopentyl glycol di(meth)acrylate, 1,6-hexane di(meth)acrylate.
(xiii) Epoxy group-containing polymerizable unsaturated monomers: Glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether and the like.
(xiv) (Meth)acrylates having polyoxyethylene chains with alkoxy groups at the molecular ends.
(xv) Polymerizable unsaturated monomers with sulfonic acid groups: 2-Acrylamide methylpropanesulfonic acid, 2-sulfoethyl (meth)acrylate, allylsulfonic acid, 4-styrenesulfonic acid and the like; and sodium salts and ammonium salts of these sulfonic acids, and the like.
(xvi) Polymerizable unsaturated monomers with phosphate groups: Acid phosphooxyethyl (meth)acrylate, acid phosphooxypropyl (meth)acrylate, acid phosphooxypoly(oxyethylene)glycol (meth)acrylate, acid phosphooxypoly(oxypropylene)glycol (meth)acrylate, and the like.
(xvii) Polymerizable unsaturated monomers with ultraviolet absorbing functional groups: 2-Hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, 2-[2-hydroxy-5-[2-(methacryloyloxy)ethyl]phenyl]-2H-benzotriazole, and the like.
(xviii) Light-stable polymerizable unsaturated monomers: 4-(Meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, and the like.
(xix) Polymerizable unsaturated monomers with carbonyl groups: Acrolein, diacetoneacrylamide, diacetonemethacrylamide, acetoacetoxyethyl methacrylate, formylstyrol, vinylalkyl ketones with 4 to 7 carbon atoms (for example, vinylmethyl ketone, vinylethyl ketone, vinylbutyl ketone), and the like.
(xx) Polymerizable unsaturated monomers with acid anhydride groups: Maleic anhydride, itaconic anhydride, citraconic anhydride, and the like.

As used herein, "polymerizable unsaturated group" means an unsaturated group that can participate in radical polymerization. Examples of such polymerizable unsaturated groups include vinyl and (meth)acryloyl.

Also, as used herein, "(meth)acrylate" refers to acrylate or methacrylate. The term "(meth)acrylic acid" refers to acrylic acid or methacrylic acid. The term "(meth)acryloyl" refers to acryloyl or methacryloyl. The term "(meth)acrylamide" refers to acrylamide or methacrylamide.

The use proportion of the hydroxyl group-containing polymerizable unsaturated monomer when producing the hydroxyl group-containing acrylic resin (x11) is preferably 1 to 50 mass %, more preferably 2 to 40 mass % and even more preferably 3 to 30 mass %, based on the total amount of the monomer components.

From the viewpoint of the curability, chipping resistance, adhesiveness and finished appearance of the obtained coating film, the hydroxyl group-containing acrylic resin (x11) has a hydroxyl value of preferably 1 to 200 mgKOH/g, more preferably 2 to 180 mgKOH/g and even more preferably 5 to 150 mgKOH/g.

Also, from the viewpoint of the storage stability of the coating material and the water resistance of the obtained coating film, the hydroxyl group-containing acrylic resin (x11) has an acid value of preferably 1 to 150 mgKOH/g, more preferably 5 to 100 mgKOH/g and even more preferably 5 to 80 mgKOH/g.

When the first coloring coating material (X) contains the hydroxyl group-containing acrylic resin (x11), the content of the hydroxyl group-containing acrylic resin (x11) is preferably 2 to 70 mass %, more preferably 5 to 50 mass % and even more preferably 10 to 40 mass %, based on the solid resin content of the first coloring coating material (X).

Hydroxyl Group-Containing Polyester Resin (x12)

The hydroxyl group-containing polyester resin (x12) can generally be produced by esterification reaction or transesterification reaction between an acid component and an alcohol component.

The acid component used may be a compound that is commonly used as an acid component for production of polyester resins. Examples of such acid components include aliphatic polybasic acids, alicyclic polybasic acids, aromatic polybasic acids and the like.

The aliphatic polybasic acid will generally be an aliphatic compound having two or more carboxyl groups in the molecule, an acid anhydride of such an aliphatic compound, or an ester of such an aliphatic compound. Examples for the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid and butanetetracarboxylic acid; anhydrides of such aliphatic polybasic carboxylic acids; and esterified products of such aliphatic polybasic carboxylic acids with lower alkyl groups of about 1 to 4 carbon atoms. The aliphatic polybasic acid used may be one type or a combination of two or more types.

The aliphatic polybasic acid used is preferably adipic acid and/or adipic anhydride, from the viewpoint of smoothness of the coating film that is to be obtained.

The alicyclic polybasic acid will generally be a compound having one or more alicyclic structures and two or more carboxyl groups in the molecule, or an acid anhydride of such a compound or an esterified form of such a compound.

An alicyclic structure is mainly a 4- to 6-membered cyclic structure. Examples of alicyclic polybasic acids include alicyclic polybasic carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; and esterified products of these alicyclic polybasic carboxylic acids with lower alkyl groups of about 1 to 4 carbon atoms. The alicyclic polybasic acid used may be one type or a combination of two or more types.

From the viewpoint of smoothness of the coating film that is to be obtained, the alicyclic polybasic acid used is preferably 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid or 4-cyclohexene-1,2-dicarboxylic anhydride, among which 1,2-cyclohexanedicarboxylic acid and/or 1,2-cyclohexanedicarboxylic anhydride are more preferably used.

An aromatic polybasic acid is generally an aromatic compound having two or more carboxyl groups in the molecule, an acid anhydride of such an aromatic compound or an esterified form of such an aromatic compound, and examples include aromatic polybasic carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of such aromatic polybasic carboxylic acids; and lower alkyl esterified products of such aromatic polybasic carboxylic acids, with 1 to 4 carbon atoms. The aromatic polybasic acid used may be one type or a combination of two or more types.

The aromatic polybasic acid used is preferably phthalic acid, phthalic anhydride, isophthalic acid, trimellitic acid or trimellitic anhydride.

Acid components other than the aforementioned aliphatic polybasic acids, alicyclic polybasic acids and aromatic polybasic acids may also be used. Such acid components are not particularly restricted, and examples include fatty acids such as coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid. These acid components may be used alone or in combinations of two or more.

As the alcohol component there may be suitably used a polyhydric alcohol having two or more hydroxyl groups in the molecule. Examples of polyhydric alcohols include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F and dimethylolpropionic acid; polylactone diols with lactone compounds such as ε-caprolactone added to these dihydric alcohols; ester diol compounds such as bis(hydroxyethyl) terephthalate; polyether diol compounds such as bisphenol A alkylene oxide addition products, polyethylene glycol, polypropylene glycol and polybutylene glycol; trihydric and greater alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds such as ε-caprolactone added to these trihydric and greater alcohols; and fatty acid esterified glycerin.

Alcohol components other than the aforementioned polyhydric alcohols may also be used. Such alcohol components are not particularly restricted, and examples include monoalcohols such as methanol, ethanol, propyl alcohol, butyl alcohol, stearyl alcohol and 2-phenoxyethanol; and alcohol compounds obtained by reacting acids with monoepoxy compounds such as propylene oxide, butylene oxide, "CARDURA E10P" (trade name of Hexion, glycidyl ester of synthetic highly-branched saturated fatty acid), and the like.

The method for producing the hydroxyl group-containing polyester resin is not particularly restricted, and it may be a common method. For example, a hydroxyl group-containing polyester resin can be produced by a method of heating the acid component and the alcohol component under a nitrogen stream at about 150 to 250° C. for about 5 to 10 hours, for esterification reaction or transesterification reaction between the acid component and alcohol component.

When the acid component and alcohol component are subjected to esterification reaction or transesterification reaction, they may be added all at once to the reactor, or one or both may be added in separate portions. Alternatively, after the hydroxyl group-containing polyester resin has first been synthesized, an acid anhydride may be reacted with the obtained hydroxyl group-containing polyester resin for half-esterification, to obtain a carboxyl group- and hydroxyl group-containing polyester resin. Also alternatively, after a carboxyl group-containing polyester resin has first been synthesized, the alcohol component may be added to obtain a hydroxyl group-containing polyester resin.

During the esterification or transesterification reaction, a known catalyst such as dibutyltin oxide, antimony trioxide, zinc acetate, manganese acetate, cobalt acetate, calcium acetate, lead acetate, tetrabutyl titanate or tetraisopropyl titanate may be used as a catalyst for acceleration of the reaction.

Also, the hydroxyl group-containing polyester resin may be modified with a fatty acid, monoepoxy compound, polyisocyanate compound or acrylic resin either during or after preparation of the resin.

Examples of fatty acids include coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid. An example of a suitable monoepoxy compound to be used is "CARDURA E10P" (trade name of Hexion, glycidyl ester of synthetic highly-branched saturated fatty acid).

Examples for the polyisocyanate compound include organic polyisocyanates, among which are aliphatic diisocyanate compounds such as lysine diisocyanate, hexamethylene diisocyanate and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate) and 1,3-(isocyanatomethyl)cyclohexane; aromatic diisocyanate compounds such as tolylene diisocyanate, xylylene diisocyanate and diphenylmethane diisocyanate; and trivalent and greater polyisocyanates such as lysine triisocyanate; as well as addition products of these organic polyisocyanates with polyhydric alcohols, low molecular weight polyester resins, water or the like; cyclized polymers formed between these organic polyisocyanates (for example, isocyanurates) and biuret-type addition products. These polyisocyanate compounds may be used alone or in mixtures of two or more.

The method used to modify the hydroxyl group-containing polyester resin with an acrylic resin may be a known method, and for example, it may be a method of polymerizing a mixture of a polymerizable unsaturated group-containing polyester resin and a polymerizable unsaturated monomer, or a method of reacting a hydroxyl group-containing polyester resin with an acrylic resin.

The hydroxyl group-containing polyester resin (x12) has a hydroxyl value of preferably 1 to 250 mgKOH/g, more preferably 2 to 200 mgKOH/g and even more preferably 5 to 200 mgKOH/g.

When the hydroxyl group-containing polyester resin (x12) also has a carboxyl group, the acid value is preferably 1 to 150 mgKOH/g, more preferably 2 to 100 mgKOH/g and even more preferably 2 to 80 mgKOH/g.

The weight-average molecular weight of the hydroxyl group-containing polyester resin (x12) is preferably 3,000 to 100,000, more preferably 4,000 to 50,000 and even more preferably 5,000 to 30,000.

As used herein, the average molecular weight is the value calculated from a chromatogram measured by gel permeation chromatography based on the molecular weight of standard polystyrene. An HLC8120GPC apparatus (product of Tosoh Corp.) was used for the gel permeation chromatography. Four columns were used, namely "TSKgel G-4000HXL", "TSKgel G-3000HXL", "TSKgel G-2500HXL" and "TSKgel G-2000HXL" (all trade names of Tosoh Corp.), with the following conditions: mobile phase: tetrahydrofuran, measuring temperature: 40° C., flow rate: 1 mL/min, detector: RI.

When the first coloring coating material (X) contains the hydroxyl group-containing polyester resin (x12), the content of the hydroxyl group-containing polyester resin (x12) is preferably 2 to 70 mass %, more preferably 5 to 50 mass % and even more preferably 10 to 40 mass %, based on the solid resin content of the first coloring coating material (X).

Hydroxyl Group-Containing Polyurethane Resin (x13)

The hydroxyl group-containing polyurethane resin (x13) may be a hydroxyl group-containing polyurethane resin obtained by reacting a polyol and a polyisocyanate compound.

Examples for the polyol include low-molecular-weight compounds including dihydric alcohols such as ethylene glycol, diethylene glycol, propylene glycol, butylene glycol and hexamethylene glycol; and trihydric alcohols such as trimethylolpropane, glycerin and pentaerythritol. High-molecular-weight compounds include polyether polyols, polyester polyols, acrylic polyols and epoxy polyols. Polyether polyols include polyethylene glycol, polypropylene glycol and polytetramethylene glycol. Polyester polyols include polycondensates of alcohols such as the aforementioned divalent alcohols, dipropylene glycol, 1,4-butane, 1,6-hexane or neopentyl glycol with dibasic acids such as adipic acid, azelaic acid or sebacic acid; lactone-based ring-opening polymer polyols such as polycaprolactone, and polycarbonate diols. Carboxyl group-containing polyols such as 2,2-dimethylolpropionic acid and 2,2-dimethylolbutanoic acid may also be used. Any of these polyols may be used alone or in combinations of two or more.

Examples of polyisocyanate compounds to be reacted with the polyol include the polyisocyanate compounds listed above for the hydroxyl group-containing polyester resin (x12). These polyisocyanate compounds may be used alone or in mixtures of two or more.

When the first coloring coating material (X) contains the hydroxyl group-containing polyurethane resin (x13), the content of the hydroxyl group-containing polyurethane resin (x13) is preferably 2 to 70 mass %, more preferably 5 to 50 mass % and even more preferably 10 to 40 mass %, based on the solid resin content of the first coloring coating material (X).

Hydroxyl Group-Containing Polyolefin Resin (x14)

Examples for the hydroxyl group-containing polyolefin resin (x14) include one or more olefinic radical homopolymers or copolymers selected from among ethylene, propylene, butene, methylbutene and isoprene, and radical copolymers of these olefins with unsaturated monomers such as vinyl acetate, butadiene, acrylic acid esters and methacrylic acid esters.

When the first coloring coating material (X) contains the hydroxyl group-containing polyolefin resin (x14), the content of the hydroxyl group-containing polyolefin resin (x14) is preferably 2 to 70 mass %, more preferably 5 to 50 mass % and even more preferably 10 to 40 mass %, based on the solid resin content of the first coloring coating material (X).

Crosslinking Agent (x2)

From the viewpoint of the curability, chipping resistance and adhesiveness of the multilayer coating film that is formed, the first coloring coating material (X) preferably contains a crosslinking agent (x2) that is reactive with the hydroxyl groups of the hydroxyl group-containing resin (x1).

When the first coloring coating material (X) contains the crosslinking agent (x2), the content of the crosslinking agent (x2) is preferably in the range of 1 to 50 mass %, more preferably 5 to 45 mass % and even more preferably 10 to 40 mass %, based on the total solid resin content of the first coloring coating material (X).

The crosslinking agent (x2) used may be, for example, a polyisocyanate compound (x21), a blocked polyisocyanate compound (x22) or an amino resin (x23).

It is particularly preferred to use a blocked polyisocyanate compound (x22) from the viewpoint of the curability, chipping resistance and adhesiveness of the multilayer coating film that is formed, and especially the curability, chipping resistance and adhesiveness with low-temperature curing, and the storage stability of the coating material.

The polyisocyanate compound (x21) is a compound with at least two isocyanate groups in the molecule, and examples include aliphatic polyisocyanates, alicyclic polyisocyanates, araliphatic polyisocyanates, aromatic polyisocyanates, and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, methyl 2,6-diisocyanatohexanoate (common name: lysine diisocyanate), and aliphatic triisocyanates such as 2,2-isocyanatoethyl 6-diisocyanatohexanoate, 1,6-diisocyanato isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name hydrogenated TDI), 2-methyl-1,3-cyclohexylene diisocyanate, 1,3- or 1,4-bis(isocyanatomethyl)cyclohexane (common name hydrogenated xylylene diisocyanate) or mixtures thereof, methylene bis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-dnisocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-dnisocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of araliphatic polyisocyanates include araliphatic diisocyanates such as methylene bis(4,1-phenylene) diisocyanate (common name MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name tetramethylxylylene diisocyanate) or mixtures thereof; and araliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name 2,6-TDI), or mixtures thereof, 4,4'-toluidine diisocyanate and 4,4'-diphenyl ether diisocyanate; aromatic triisocyanates such as triphenylmethane-4,4',4"-triisocyanate, 1,3,5-triisocyanatobenzene and 2,4,6-triisocyanatotoluene; and aromatic tetraisocyanates such as 4,4'-diphenylmethane-2,2',5, 5'-tetraisocyanate.

Examples of the aforementioned polyisocyanate derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

These polyisocyanates and their derivatives may be used alone or in combinations of two or more. Aliphatic diisocyanates, alicyclic diisocyanates and their derivatives are preferred among these polyisocyanates.

Also, the polyisocyanate compound that is used may be a prepolymer obtained by reacting any of the aforementioned polyisocyanates and their derivatives with a compound that can react with the polyisocyanate, under conditions with an excess of isocyanate groups. Compounds that can react with the aforementioned polyisocyanates include compounds with active hydrogen groups such as hydroxyl and amino, and specifically there may be used polyhydric alcohols, low molecular weight polyester resins, amines, water and the like.

The polyisocyanate compound used may also be a polymer of an isocyanate group-containing polymerizable unsaturated monomer, or a copolymer of such an isocyanate group-containing polymerizable unsaturated monomer and a polymerizable unsaturated monomer other than the isocyanate group-containing polymerizable unsaturated monomer.

The aforementioned blocked polyisocyanate compound (x22) is a compound wherein the isocyanate groups of the polyisocyanate compound (x21) are blocked with a blocking agent.

Examples of such blocking agents include phenol-based compounds such as phenol, cresol, xylenol, nitrophenol, ethylphenol, hydroxydiphenyl, butylphenol, isopropylphenol, nonylphenol, octylphenol and methyl hydroxybenzoate; lactam-based compounds such as ε-caprolactam, δ-valerolactam, γ-butyrolactam and β-propiolactam; aliphatic alcohol-based compounds such as methanol, ethanol, propyl alcohol, butyl alcohol, amyl alcohol and lauryl alcohol; ether-based compounds such as ethyleneglycol monomethyl ether, ethyleneglycol monoethyl ether, ethyleneglycol monobutyl ether, diethyleneglycol monomethyl ether, diethyleneglycol monoethyl ether, propyleneglycol monomethyl ether and methoxymethanol; alcohol-based compounds such as benzyl alcohol, glycolic acid, methyl glycolate, ethyl glycolate, butyl glycolate, lactic acid, methyl lactate, ethyl lactate, butyl lactate, methylolurea, methylolmelamine, diacetone alcohol, 2-hydroxyethyl acrylate and 2-hydroxyethyl methacrylate; oxime-based compounds such as formamideoxime, acetamideoxime, acetooxime, methylethylketooxime, diacetylmonooxime, benzophenoneoxime and cyclohexaneoxime; active methylene-based compounds such as dimethyl malonate, diethyl malonate, ethyl acetoacetate, methyl acetoacetate and acetylacetone; mercaptane-based compounds such as butylmercaptane, t-butylmercaptane, hexylmercaptane, t-dodecylmercaptane, 2-mercaptobenzothiazole, thiophenol, methylthiophenol and ethylthiophenol; acid amide-based compounds such as acetoanilide, acetanisidide, acetotoluide, acrylamide, methacrylamide, acetic acid amide, stearic acid amide and benzamide; imide-based compounds such as succinic acid imide, phthalic acid imide and maleic acid imide; amine-based compounds such as diphenylamine, phenylnaphthylamine, xylidine, N-phenylxylidine, carbazole, aniline, naphthylamine, butylamine, dibutylamine and butylphenylamine; imidazole-based compounds such as imidazole and 2-ethylimidazole; urea-based compounds such as urea, thiourea, ethyleneurea, ethylenethiourea and diphenylurea; carbamic acid ester-based compounds such as phenyl N-phenylcarbamate; imine-based compounds such as ethyleneimine and propyleneimine; sulfurous acid salt-based compounds such as sodium bisulfite and potassium bisulfite; and azole-based compounds. Azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole and 3-methyl-5-phenylpyrazole; imidazole or imidazole derivatives, such as imidazole, benzimidazole, 2-methylimidazole, 2-ethylimidazole and 2-phenylimidazole; and imidazoline derivatives such as 2-methylimidazoline and 2-phenylimidazoline.

Preferred blocking agents among these include active methylene-based blocking agents, and pyrazole or pyrazole derivatives.

A solvent may also be added as necessary for blocking (reaction with a blocking agent). The solvent used for the blocking reaction may be any one that is not reactive with isocyanate groups, examples of which include ketones such as acetone and methyl ethyl ketone, esters such as ethyl acetate, and N-methyl-2-pyrrolidone (NMP) solvents.

Blocking agents that may be used include hydroxycarboxylic acids having one or more hydroxyl groups and one or more carboxyl groups, such as hydroxypivalic acid or dimethylolpropionic acid. It is particularly preferred to use a blocked polyisocyanate compound which has the isocyanate group blocked using the hydroxycarboxylic acid, and subsequently has the carboxyl group of the hydroxycarboxylic acid neutralized, to provide water-dispersibility.

The amino resin (x23) used may be a partially methylolated amino resin or totally methylolated amino resin, obtained by reacting an amino component and an aldehyde component. Examples of such amino components include melamine, urea, benzoguanamine, acetoguanamine, steroguanamine, spiroguanamine and dicyandiamide. Aldehyde components include formaldehyde, paraformaldehyde, acetaldehyde and benzaldehyde.

Also, the methylol groups in the methylolated amino resin may be partially or completely etherified with a suitable alcohol. Examples of alcohols to be used for the etherification include methyl alcohol, ethyl alcohol, n-propyl alcohol, i-propyl alcohol, n-butyl alcohol, i-butyl alcohol, 2-ethyl-1-butanol and 2-ethyl-1-hexanol.

The amino resin is preferably a melamine resin. Particularly preferred are methyl etherified melamine resins having a methylol group of a partially or completely methylolated melamine resin partially or completely etherified with methyl alcohol, butyl etherified melamine resins having a methylol group of a partially or completely methylolated melamine resin partially or completely etherified with butyl alcohol, and methyl-butyl mixed etherified melamine resins having methylol groups of a partially or completely methylolated melamine resin partially or completely etherified with methyl alcohol and butyl alcohol, among which methyl-butyl mixed etherified melamine resins are more preferred.

The melamine resin has a weight-average molecular weight of preferably 400 to 6,000, more preferably 500 to 4,000 and even more preferably 600 to 3,000.

The melamine resin used may be a commercial product. Examples of trade names of commercial products include "CYMEL 202", "CYMEL 203", "CYMEL 238", "CYMEL 250", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116" and "CYMEL 1130" (all products of Allnex, Japan), and "U-VAN 120", "U-VAN 20HS", "U-VAN 20SE60", "U-VAN 2021", "U-VAN 2028" and "U-VAN 28-60" (all products of Mitsui Chemicals, Inc.).

When the first coloring coating material (X) contains a melamine resin, the first coloring coating material (X) may contain a sulfonic acid such as paratoluenesulfonic acid, dodecylbenzenesulfonic acid or dinonylnaphthalenesulfonic acid; a neutral salt of sulfonic acid and an amine; or a neutral salt of a phosphoric acid ester compound and an amine, as a curing catalyst.

Each crosslinking agent (x2) used may be of a single type or a combination of two or more types.

When the first coloring coating material (X) contains a hydroxyl group-containing resin (x1) and crosslinking agent (x2), the content ratio of the hydroxyl group-containing resin (x1) and crosslinking agent (x2) is suitably in the range of 30 to 99 mass %, preferably 50 to 95 mass % and more preferably 55 to 90 mass % of the hydroxyl group-containing resin (x1) and 1 to 70 mass %, preferably 5 to 50 mass % and more preferably 10 to 45 mass % of the crosslinking agent (x2), based on the total solid content of the hydroxyl group-containing resin (x1) and crosslinking agent (x2), from the viewpoint of the curability, chipping resistance, adhesiveness and finished appearance of the multilayer coating film that is formed.

The first coloring coating material (X) preferably further contains a pigment. The pigment used may be a color pigment, extender pigment or luster pigment, for example. Such pigments may be used alone or in combinations of two or more.

When the first coloring coating material (X) contains a pigment, the content of the pigment is suitably in the range of 1 to 200 parts by mass, preferably 20 to 160 parts by mass and more preferably 50 to 140 parts by mass, based on 100 parts by mass of the solid resin content in the first coloring coating material (X).

Examples of color pigments include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments and diketopyrrolopyrrole-based pigments, among which titanium oxide and carbon black are most suitable for use.

When the first coloring coating material (X) contains a color pigment, the content of the color pigment is suitably in the range of 1 to 180 parts by mass, preferably 5 to 160 parts by mass and more preferably 15 to 150 parts by mass, based on 100 parts by mass of the solid resin content in the first coloring coating material (X).

Examples of extender pigments include barium sulfate, talc, clay, kaolin, barium carbonate, calcium carbonate, silica and alumina white. The extender pigment used is preferably barium sulfate or talc from the viewpoint of coating stability and finished appearance.

When the first coloring coating material (X) contains an extender pigment, the content of the extender pigment is suitably in the range of 1 to 180 parts by mass, preferably 5 to 140 parts by mass and more preferably 10 to 120 parts by mass, based on 100 parts by mass of the solid resin content in the first coloring coating material (X).

Examples of luster pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica. Use of an aluminum pigment is preferred. Aluminum pigments include non-leafing aluminum pigments and leafing aluminum pigments, either of which may be used.

The luster pigment is preferably flaky. The luster pigment preferably has a dimension in the lengthwise direction in the range of generally 1 to 100 μm and especially 5 to 40 μm, and a thickness in the range of generally 0.001 to 5 μm and especially 0.01 to 2 μm.

When the first coloring coating material (X) contains a luster pigment, the content of the luster pigment is suitably in the range of 1 to 100 parts by mass, preferably 2 to 60 parts by mass and more preferably 3 to 40 parts by mass, based on 100 parts by mass of the solid resin content in the first coloring coating material (X).

The first coloring coating material (X) preferably also contains a flat pigment from the viewpoint of chipping resistance. Flat pigments include pigments such as talc, aluminum oxide, mica, titanium oxide- or iron oxide-coated aluminum oxide, and titanium oxide- or iron oxide-coated mica, among which talc is preferably used.

Examples of commercially available talc products include "SIMGON", "TALC MS", "MICRO ACE SG-95", "MICRO ACE P-8", "MICRO ACE P-6", "MICRO ACE P-4", "MICRO ACE P-3", "MICRO ACE P-2", "MICRO ACE L-1", "MICRO ACE K-1", "MICRO ACE L-G", "MICRO ACE S-3" and "NANO ACE D-1000" (all trade names of Nippon Talc Co., Ltd.), "P TALC", "PH TALC", "PS TALC", "TTK TALC", "TT TALC", "T TALC", "ST TALC", "HIGH TORON", "HIGH TORON A", "MICRO-LITe", "HIGH RACK" and "HIGH MICRON HE5" (all trade names of Takehara Kagaku Kogyo Co., Ltd.).

When the first coloring coating material (X) contains a flat pigment, the flat pigment content is suitably in the range of 0.1 to 30 parts by mass, preferably 1 to 25 parts by mass and more preferably 3 to 20 parts by mass, based on 100 parts by mass as the solid resin content of the first coloring coating material (X), from the viewpoint of the chipping resistance and finished appearance of the multilayer coating film that is formed.

If necessary, the first coloring coating material (X) may also contain a resin that does not contain a hydroxyl group. Examples of resins without hydroxyl groups include acrylic resins without hydroxyl groups, polyolefin resins without hydroxyl groups and polyurethane resins without hydroxyl groups.

The first coloring coating material (X) may further contain, as necessary, an organic solvent, curing catalyst, dispersing agent, anti-settling agent, antifoaming agent, thickening agent, ultraviolet absorber, light stabilizer or surface control agent, or other additives as appropriate.

Examples of organic solvents include ketones such as acetone, methyl ethyl ketone and methyl isobutyl ketone; esters such as ethyl acetate, butyl acetate, methyl benzoate, ethyl ethoxypropionate, ethyl propionate and methyl propionate; alcohols such as isopropanol, n-butanol, isobutanol and 2-ethylhexanol; ethers such as tetrahydrofuran, dioxane and dimethoxyethane; glycol ethers such as ethyleneglycol monomethyl ether, ethyleneglycol monoethyl ether, diethyleneglycol monomethyl ether, propyleneglycol monomethyl ether acetate and 3-methoxybutyl acetate; aromatic hydrocarbons, aliphatic hydrocarbons, and the like.

For use, the first coloring coating material (X) may be applied after adding water and/or an organic solvent for dilution to adjust it to the appropriate viscosity, as necessary.

The suitable viscosity will differ depending on the coating composition, and for example, when prepared using a No. 4 Ford cup viscometer, it may be a viscosity at 20° C. of usually about 20 to 60 seconds and preferably about 25 to 50 seconds.

The solid concentration during application of the first coloring coating material (X) is usually suitable at about 5 to 70 mass % and preferably about 10 to 50 mass %.

The first coloring coating material (X) may be either a one-component type coating material or a multi-component coating material, but it is preferably a one-component type coating material from the viewpoint of excellent productivity without a coating material mixing step, and of allowing maintenance of the coating machine to be simplified.

The first coloring coating material (X) may be coated onto an article to be coated by a known method such as air spray coating, airless spray coating, rotary atomizing coating or curtain coating, for example, and electrostatic application may also be carried out during the coating. Methods of air spray coating and rotary atomizing coating are preferred among these. Such coating methods may be carried out once or several times, until the desired film thickness is obtained.

The coating amount of the first coloring coating material (X) is usually preferred to be an amount of 5 to 40 μm, preferably 7 to 30 μm and more preferably 10 to 25 μm, as the cured film thickness.

Before applying the second coloring coating material (Y) described below, the first coloring coating film may be subjected to preheating, air blowing and the like under heating conditions that substantially do not cure the coating film. The temperature for preheating is preferably 40 to 100° C., more preferably 50 to 90° C. and even more preferably 60 to 80° C. The preheating time is preferably 30 seconds to 15 minutes, more preferably 1 to 10 minutes and even more preferably 2 to 5 minutes. Air blowing may also be carried out by blasting the coated surface of the article to be coated with heated air at a temperature of usually ordinary temperature or 25° C. to 80° C., for a period of 30 seconds to 15 minutes, for example.

Step (2)

In step (2), a second coloring coating material (Y) is applied onto the first coloring coating film formed in step (1), to form a second coloring coating film.

Second Coloring Coating Material (Y)

The second coloring coating material (Y) of the invention is a coating composition containing a hydroxyl group-containing resin (y1).

The form of the second coloring coating material (Y) is not particularly restricted, and it may be in the form of an aqueous coating material, organic solvent-based coating material or solventless coating material. When the second coloring coating material (Y) is an aqueous coating material, the water content in the second coloring coating material (Y) is in the range of 10 to 90 mass %, preferably 20 to 80 mass % and more preferably 30 to 70 mass %. According to the invention, the second coloring coating material (Y) is preferably an aqueous coating material from the viewpoint of reducing the environmental load.

Hydroxyl Group-Containing Resin (y1)

The hydroxyl group-containing resin (y1) is a resin having at least one hydroxyl group in the molecule. Examples for the hydroxyl group-containing resin (y1) include resins such as acrylic resins, polyester resins, polyurethane resins, polyether resins, polycarbonate resins, epoxy resins and alkyd resins, which have hydroxyl groups. These may be used alone or in combinations of two or more.

The content of the hydroxyl group-containing resin (y1) in the second coloring coating material (Y) is in the range of 1 to 100 mass %, preferably 10 to 90 mass % and more preferably 20 to 80 mass %, based on the total amount of the solid resin content in the second coloring coating material (Y).

From the viewpoint of the chipping resistance, adhesiveness and finished outer appearance of the multilayer coating film that is to be formed, the hydroxyl group-containing resin (y1) used may be a hydroxyl group-containing acrylic resin (y11), a hydroxyl group-containing polyester resin (y12) and/or a hydroxyl group-containing polyurethane resin (y13).

Hydroxyl Group-Containing Acrylic Resin (y11)

The hydroxyl group-containing acrylic resin (y11) can be produced, for example, by copolymerizing a hydroxyl group-containing polymerizable unsaturated monomer and another polymerizable unsaturated monomer that is copolymerizable with the hydroxyl group-containing polymerizable unsaturated monomer, by a known method such as a solution polymerization method in an organic solvent, or an emulsion polymerization method in water. The hydroxyl group-containing acrylic resin (y11) can be produced by the method described for the hydroxyl group-containing acrylic resin (x11), for example.

From the viewpoint of the curability, chipping resistance, adhesiveness and finished appearance of the obtained coating film, the hydroxyl group-containing acrylic resin (y11) has a hydroxyl value of preferably 1 to 200 mgKOH/g, more preferably 2 to 150 mgKOH/g and even more preferably 5 to 100 mgKOH/g.

Also, from the viewpoint of the storage stability of the coating material and the water resistance of the obtained coating film, the hydroxyl group-containing acrylic resin (y11) has an acid value of preferably 1 to 150 mgKOH/g, more preferably 5 to 100 mgKOH/g and even more preferably 10 to 80 mgKOH/g.

When the second coloring coating material (Y) contains a hydroxyl group-containing acrylic resin (y11), the content of the hydroxyl group-containing acrylic resin (y11) is preferably 2 to 70 mass %, more preferably 10 to 65 mass % and even more preferably 20 to 60 mass %, based on the solid resin content of the second coloring coating material (Y).

Hydroxyl Group-Containing Polyester Resin (y12)

The hydroxyl group-containing polyester resin (y12) can generally be produced by esterification reaction or transesterification reaction between an acid component and an alcohol component. The hydroxyl group-containing polyester resin (y12) can be produced by the method described for the hydroxyl group-containing polyester resin (x12), for example.

The hydroxyl group-containing polyester resin (y12) has a hydroxyl value of preferably 1 to 200 mgKOH/g, more preferably 2 to 180 mgKOH/g and even more preferably 5 to 170 mgKOH/g.

When the hydroxyl group-containing polyester resin (y12) also has a carboxyl group, the acid value is preferably 5 to 150 mgKOH/g, more preferably 10 to 100 mgKOH/g and even more preferably 15 to 80 mgKOH/g.

The weight-average molecular weight of the hydroxyl group-containing polyester resin (y12) is preferably 3,000 to 100,000, more preferably 4,000 to 50,000 and even more preferably 5,000 to 30,000.

When the second coloring coating material (Y) contains the hydroxyl group-containing polyester resin (y12), the content of the hydroxyl group-containing polyester resin (y12) is preferably 2 to 70 mass %, more preferably 10 to 65 mass % and even more preferably 20 to 60 mass %, based on the solid resin content of the second coloring coating material (Y).

Using a hydroxyl group-containing acrylic resin (y11) and a hydroxyl group-containing polyester resin (y12) in combination as the hydroxyl group-containing resin (y1) is preferred from the viewpoint of improving the finished appearance of the coating film. When used in combination, their proportion is preferably about 10 to 90 mass % and especially about 20 to 80 mass % of the former to about 90 to 10 mass % and especially about 80 to 20 mass % of the latter, based on the total amount of the hydroxyl group-containing acrylic resin (y11) and the hydroxyl group-containing polyester resin (y12).

Hydroxyl Group-Containing Polyurethane Resin (y13)

The hydroxyl group-containing polyurethane resin (y13) may be a hydroxyl group-containing polyurethane resin obtained by reacting a polyol and a polyisocyanate compound. The hydroxyl group-containing polyurethane resin (y13) can be produced by the method described for the hydroxyl group-containing polyurethane resin (x13), for example.

When the second coloring coating material (Y) contains the hydroxyl group-containing polyurethane resin (y13), the content of the hydroxyl group-containing polyurethane resin (y13) is preferably 2 to 70 mass %, more preferably 5 to 50 mass % and even more preferably 10 to 40 mass %, based on the solid resin content of the second coloring coating material (Y).

Crosslinking Agent (y2)

From the viewpoint of the curability, chipping resistance and adhesiveness of the obtained coating film, the second coloring coating material (Y) preferably contains a crosslinking agent (y2) that is reactive with the hydroxyl groups of the hydroxyl group-containing resin (y1).

The crosslinking agent (y2) used may be, for example, a polyisocyanate compound (y21), a blocked polyisocyanate compound (y22) or an amino resin (y23).

Examples for compounds to be used as the polyisocyanate compound (y21), blocked polyisocyanate compound (y22) and amino resin (y23) include those mentioned above for the polyisocyanate compound (x21), blocked polyisocyanate compound (x22) and amino resin (x23), respectively.

For the crosslinking agent (y2) it is particularly preferred to use a blocked polyisocyanate compound (y22) from the viewpoint of the curability, chipping resistance and adhesiveness of the multilayer coating film that is formed, and especially the curability, chipping resistance and adhesiveness with low-temperature curing, and the storage stability of the coating material.

When the second coloring coating material (Y) contains a hydroxyl group-containing resin (y1) and crosslinking agent (y2), the content ratio of the hydroxyl group-containing resin (y1) and crosslinking agent (y2) is suitably in the range of 30 to 99 mass %, preferably 50 to 95 mass % and more preferably 55 to 90 mass % of the hydroxyl group-containing resin (y1) and 1 to 70 mass %, preferably 5 to 50 mass % and more preferably 10 to 45 mass % of the crosslinking agent (y2) based on the total solid content of the hydroxyl group-containing resin (y1) and crosslinking agent (y2), from the viewpoint of the curability, chipping resistance, adhesiveness and finished appearance of the multilayer coating film that is formed.

The second coloring coating material (Y) preferably further contains a pigment. The pigment used may be a luster pigment, color pigment or extender pigment, for example. Such pigments may be used alone or in combinations of two or more.

When the second coloring coating material (Y) contains a pigment, the content of the pigment is suitably in the range of 1 to 100 parts by mass, preferably 2 to 60 parts by mass and more preferably 3 to 40 parts by mass, based on 100 parts by mass of the solid resin content in the second coloring coating material (Y).

Examples of luster pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica. Use of an aluminum pigment is preferred. Aluminum pigments include non-leafing aluminum pigments and leafing aluminum pigments, either of which may be used.

The luster pigment is preferably flaky. The luster pigment preferably has a dimension in the lengthwise direction in the range of generally 1 to 100 μm and especially 5 to 40 μm, and a thickness in the range of generally 0.001 to 5 μm and especially 0.01 to 2 μm.

When the second coloring coating material (Y) contains a luster pigment, the content of the luster pigment is suitably in the range of 1 to 100 parts by mass, preferably 2 to 60 parts by mass and more preferably 3 to 40 parts by mass, based on 100 parts by mass of the solid resin content in the second coloring coating material (Y).

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like.

When the second coloring coating material (Y) contains a color pigment, the content of the color pigment is suitably in the range of 1 to 80 parts by mass, preferably 5 to 70 parts by mass and more preferably 10 to 50 parts by mass, based on 100 parts by mass of the solid resin content in the second coloring coating material (Y).

Examples of extender pigments include barium sulfate, talc, clay, kaolin, barium carbonate, calcium carbonate, silica and alumina white. The extender pigment used is preferably barium sulfate or talc from the viewpoint of the design property.

When the second coloring coating material (Y) contains an extender pigment, the content of the extender pigment is suitably in the range of 50 parts by mass or less, preferably 3 to 50 parts by mass and more preferably 5 to 30 parts by mass, based on 100 parts by mass of the solid resin content in the second coloring coating material (Y).

The second coloring coating material (Y) may further contain, as necessary, a resin without hydroxyl groups, an organic solvent, curing catalyst, dispersing agent, anti-settling agent, antifoaming agent, thickening agent, ultraviolet absorber, light stabilizer or surface control agent, or other additives as appropriate.

Examples of resins without hydroxyl groups include acrylic resins without hydroxyl groups and polyurethane resins without hydroxyl groups.

Examples of organic solvents include ketone-based solvents such as acetone, methyl ethyl ketone and methyl isobutyl ketone; ester-based solvents such as ethyl acetate, butyl acetate, methyl benzoate, ethyl ethoxypropionate, ethyl propionate and methyl propionate; alcohol-based solvents such as isopropanol, n-butanol, isobutanol and 2-ethylhexanol; ether-based solvents such as tetrahydrofuran, dioxane and dimethoxyethane; glycol ether-based solvents such as ethyleneglycol monomethyl ether, ethyleneglycol monoethyl ether, diethyleneglycol monomethyl ether, propyleneglycol monomethyl ether acetate and 3-methoxybutyl acetate; and hydrocarbon-based solvents such as aromatic hydrobon-based solvents and aliphatic hydrocarbon-based solvents.

For use, the second coloring coating material (Y) may be applied after adding water and/or an organic solvent for dilution to adjust it to the appropriate viscosity, as necessary.

The suitable viscosity will differ depending on the coating composition, and for example, when prepared using a No. 4 Ford cup viscometer, it may be a viscosity at 20° C. of usually about 20 to 60 seconds and preferably about 25 to 50 seconds. The solid concentration during application of the second coloring coating material (Y) is usually suitable at about 5 to 50 mass % and preferably about 10 to 40 mass %.

The second coloring coating material (Y) may be either a one-component type coating material or a multi-component coating material, but it is preferably a one-component type coating material from the viewpoint of excellent productivity without a coating material mixing step, and of allowing maintenance of the coating machine to be simplified.

The second coloring coating material (Y) may be coated onto an article to be coated by a known method such as air spray coating, airless spray coating, rotary atomizing coating or curtain coating, for example, and electrostatic application may also be carried out during the coating. Methods of air spray coating and rotary atomizing coating are preferred among these. Such coating methods may be carried out once or several times, until the desired film thickness is obtained.

The coating amount of the second coloring coating material (Y) is usually preferred to be an amount of 5 to 30 μm, preferably 7 to 25 μm and more preferably 10 to 20 μm, as the cured film thickness.

Before applying the clear coating material (Z) described below, the second coloring coating film may be subjected to preheating, air blowing and the like under heating conditions that substantially do not cure the coating film. The temperature for preheating is preferably 40 to 100° C., more preferably 50 to 90° C. and even more preferably 60 to 80° C. The preheating time is preferably 30 seconds to 15 minutes, more preferably 1 to 10 minutes and even more preferably 2 to 5 minutes. Air blowing may also be carried out by blasting the coated surface of the article to be coated with heated air at a temperature of usually ordinary temperature or 25° C. to 80° C., for a period of 30 seconds to 15 minutes, for example.

Step (3)

In step (3), a clear coating material (Z) is applied onto the second coloring coating film formed in step (2), to form a clear coating film.

Clear Coating Material (Z)

The clear coating material (Z) of the invention is a coating composition containing a hydroxyl group-containing acrylic resin (a) and a polyisocyanate compound (b), where the polyisocyanate compound (b) contains an aliphatic triisocyanate compound (b1) with a molecular weight in the range of 200 to 350 as at least one of its types.

Hydroxyl Group-Containing Acrylic Resin (a)

The hydroxyl group-containing acrylic resin (a) is an acrylic resin having at least one hydroxyl group in the molecule.

The hydroxyl group-containing acrylic resin (a) can be produced, for example, by copolymerizing a hydroxyl group-containing polymerizable unsaturated monomer and another polymerizable unsaturated monomer that is copolymerizable with the hydroxyl group-containing polymerizable unsaturated monomer, by a known method such as a solution polymerization method in an organic solvent, or an emulsion polymerization method in water. It is preferably produced by a solution polymerization in an organic solvent.

The hydroxyl group-containing polymerizable unsaturated monomer and the other polymerizable unsaturated monomer that is copolymerizable with the hydroxyl group-containing polymerizable unsaturated monomer may be the polymerizable unsaturated monomers mentioned above for the hydroxyl group-containing acrylic resin (x11), for example.

From the viewpoint of the curability, chipping resistance, adhesiveness and finished appearance of the multilayer coating film that is formed, the amount of the hydroxyl group-containing polymerizable unsaturated monomer used for production of the hydroxyl group-containing acrylic resin (a) is suitably in the range of 15 to 50 mass % and preferably 20 to 40 mass % with respect to the total amount of the copolymerized monomer components.

From the viewpoint of the curability, chipping resistance, adhesiveness and finished appearance of the multilayer coating film that is formed, the hydroxyl value of the hydroxyl group-containing acrylic resin (a) is in the range of preferably 50 to 210 mgKOH/g, more preferably 80 to 200 mgKOH/g and even more preferably 100 to 170 mgKOH/g.

From the viewpoint of the curability, chipping resistance, adhesiveness and finished appearance of the multilayer coating film that is formed, the weight-average molecular weight of the hydroxyl group-containing acrylic resin (a) is preferably in the range of 2000 to 50,000, especially 3000 to 30,000 and most especially 4000 to 10,000.

The acid value of the hydroxyl group-containing acrylic resin (a) is preferably in the range of 30 mgKOH/g or lower and especially 1 to 20 mgKOH/g, from the viewpoint of the finished appearance and water resistance of the multilayer coating film that is formed, and the pot life of the clear coating material (Z).

From the viewpoint of the curability, hardness, chipping resistance, adhesiveness and finished appearance of the multilayer coating film that is formed, the glass transition temperature of the hydroxyl group-containing acrylic resin (a) is preferably in the range of −50 to 60° C., especially 10 to 50° C. and most especially 20 to 45° C.

For the purpose of the invention, the glass transition temperature (° C.) of the acrylic resin is calculated by the following formula.

$$1/Tg(K)=(W1/T1)+(W2/T2)+ \ldots \quad (1)$$

$$Tg(°\ C.)=Tg(K)-273 \quad (2)$$

In these formulas, W1, W2, ... represent the mass fractions of the monomers used for copolymerization, and T1, T2, ... represent the Tg (K) for homopolymers of each of the monomers.

The values for T1, T2 ... are those according to Polymer Hand Book (Second Edition, J. Brandup, E. H. Immergut, ed.) III, pp. 139-179. The glass transition temperature (° C.) used for cases where the Tg of the homopolymer of the monomer was unknown was the static glass transition temperature (° C.), and it was obtained using a "DSC-220U" differential scanning calorimeter (product of Seiko Instruments, Inc.), for example, by taking a sample into a measuring cup, subjecting it to vacuum suction to completely remove the solvent, and then measuring the change in heat quantity in a range of −20° C. to +200° C. at a temperature-elevating rate of 3° C./min and recording the static glass transition temperature as the change point of the original baseline at the low-temperature end.

The copolymerization method for obtaining a hydroxyl group-containing acrylic resin (a) by copolymerization of a mixture of the aforementioned polymerizable unsaturated monomers is most preferably a solution polymerization method in which polymerization is carried out in an organic solvent in the presence of a polymerization initiator.

Examples of organic solvents to be used in the solution polymerization method include aromatic solvents such as toluene, xylene and "SWAZOLE 1000" (high boiling point petroleum-based solvent, trade name of Cosmo Oil Co., Ltd.); ester-based solvents such as ethyl acetate, butyl acetate, propyl propionate, butyl propionate, 1-methoxy-2-propyl acetate, 2-ethoxyethyl propionate, 3-methoxybutyl acetate, ethyleneglycol ethyl ether acetate and propyleneglycol methyl ether acetate; ketone-based solvents such as methyl ethyl ketone, methylisobutyl ketone and methyl amyl ketone; and alcohol-based solvents such as isopropanol, n-butanol, isobutanol and 2-ethylhexanol.

These organic solvents may be used alone or in combinations of two or more, but it is preferred to use an ester-based solvent or a ketone-based solvent, from the viewpoint of solubility of the acrylic resin. Aromatic solvents may also be used in appropriate combinations.

Examples of polymerization initiators that may be used for copolymerization of the hydroxyl group-containing acrylic resin (a) include publicly known radical polymerization initiators such as 2,2'-azobisisobutyronitrile, benzoyl peroxide, di-t-butyl peroxide, di-t-amyl peroxide, t-butyl peroctoate, 2,2'-azobis(2-methylbutyronitrile) and 2,2'-azobis(2,4-dimethylvaleronitrile).

The hydroxyl group-containing acrylic resin (a) may be used as a single type alone, or two or more may be used in combination.

From the viewpoint of the finished appearance of the coating film that is formed, the hydroxyl group-containing acrylic resin (a) is preferably a secondary hydroxyl group-containing acrylic resin (a').

The secondary hydroxyl group-containing acrylic resin (a') can be produced, for example, using a secondary hydroxyl group-containing polymerizable unsaturated monomer as one type of hydroxyl group-containing polymerizable unsaturated monomer in the production method for the hydroxyl group-containing acrylic resin (a) described above.

Examples of secondary hydroxyl group-containing polymerizable unsaturated monomers include polymerizable unsaturated monomers of 2 to 8, preferably 3 to 6 and more preferably 3 or 4 carbon atoms in the alkyl group of the ester portion, and having a secondary hydroxyl group, such as 2-hydroxypropyl (meth)acrylate, 2-hydroxybutyl (meth)acrylate and 3-hydroxybutyl (meth)acrylate; and addition products of (meth)acrylic acid with epoxy group-containing compounds (for example, "CARDURA E10P", trade name of Hexion, glycidyl ester of synthetic highly-branched saturated fatty acid). Any of these may be used alone or in combinations of two or more. From the viewpoint of the finished appearance of the coating film that is formed, it is preferred to use 2-hydroxypropyl (meth)acrylate.

From the viewpoint of the curability and finished appearance of the coating film that is formed, the amount of the secondary hydroxyl group-containing polymerizable unsaturated monomer used, when a secondary hydroxyl group-containing polymerizable unsaturated monomer is used for production of the secondary hydroxyl group-containing acrylic resin (a'), is suitably in the range of 15 to 45 mass % and preferably 20 to 40 mass % with respect to the total amount of the copolymerized monomer components.

From the viewpoint of the curability and finished appearance of the coating film that is formed, the content ratio of the secondary hydroxyl group-containing polymerizable unsaturated monomer in the total amount of the hydroxyl group-containing polymerizable unsaturated monomer of the secondary hydroxyl group-containing acrylic resin (a') is suitably in the range of 50 to 100 mass %, preferably 55 to 100 mass % and more preferably 60 to 100 mass %.

From the viewpoint of the curability and finished appearance of the coating film that is formed, the hydroxyl group-containing acrylic resin (a) that is used is preferably a hydroxyl group-containing acrylic resin produced using an aromatic ring-containing polymerizable unsaturated monomer as at least one type of its other polymerizable unsaturated monomer that is copolymerizable with the hydroxyl group-containing polymerizable unsaturated monomer. The aromatic ring-containing polymerizable unsaturated monomer that is used is preferably styrene, from the viewpoint of the finished appearance and hardness of the coating film that is formed.

When an aromatic ring-containing polymerizable unsaturated monomer is used as the other polymerizable unsaturated monomer that is copolymerizable with the hydroxyl group-containing polymerizable unsaturated monomer, its mixing proportion is preferably in the range of 3 to 50 mass % and especially 5 to 40 mass %, with respect to the total amount of monomer components.

From the viewpoint of the hardness of the coating film that is formed, the hydroxyl group-containing acrylic resin (a) used is preferably a hydroxyl group-containing acrylic resin produced using a polymerizable unsaturated monomer containing an alicyclic hydrocarbon group of 6 to 20 carbon atoms, as at least one type of its other polymerizable unsaturated monomer that is copolymerizable with the hydroxyl group-containing polymerizable unsaturated monomer.

Examples of alicyclic hydrocarbon groups of 6 to 20 carbon atoms include cyclohexyl, cyclooctyl, cyclododecyl, tricyclodecanyl, isobornyl and adamantyl groups.

Specific examples of polymerizable unsaturated monomers containing alicyclic hydrocarbon groups of 6 to 20 carbon atoms include cycloalkyl (meth)acrylates such as cyclohexyl (meth)acrylate, methylcyclohexyl (meth)acrylate, t-butylcyclohexyl (meth)acrylate, cyclododecyl (meth)acrylate and tricyclodecanyl (meth)acrylate; and bridged alicyclic hydrocarbon group-containing polymerizable unsaturated monomers such as isobornyl (meth)acrylate and adamantyl (meth)acrylate.

From the viewpoint of the hardness of the coating film that is formed, the polymerizable unsaturated monomer containing an alicyclic hydrocarbon group of 6 to 20 carbon atoms is preferably isobornyl (meth)acrylate.

When a polymerizable unsaturated monomer containing an alicyclic hydrocarbon group of 6 to 20 carbon atoms is used, the mixing proportion is preferably in the range of 10 to 60 mass %, especially 15 to 50 mass % and most especially 20 to 45 mass %, with respect to the total amount of monomer components.

Polyisocyanate Compound (b)

The clear coating material (Z) of the invention contains a polyisocyanate compound (b). The polyisocyanate compound (b) contains an aliphatic triisocyanate compound (b1) with a molecular weight in the range of 200 to 350, as at least one of its types.

Aliphatic Triisocyanate Compound (b1) The aliphatic triisocyanate compound (b1) is an aliphatic polyisocyanate compound having a molecular weight in the range of 200 to 350 and having three isocyanate groups. From the viewpoint of the chipping resistance, adhesiveness and finished outer appearance of the multilayer coating film that is formed, the molecular weight is preferably in the range of 200 to 300 and more preferably in the range of 230 to 280.

Specific examples for the aliphatic triisocyanate compound (b1) include 1,8-diisocyanato-4-isocyanatomethyloctane, 2-isocyanatoethyl (2S)-2,6-diisocyanatohexanoate (common name lysine triisocyanate), 2-isocyanatoethyl 2,6-diisocyanatohexanoate and 1,6,11-triisocyanatoundecane, which may be used alone or in combinations of two or more.

From the viewpoint of the chipping resistance, adhesiveness and finished outer appearance of the multilayer coating film that is formed, the aliphatic triisocyanate compound (b1) used is preferably 1,8-diisocyanato-4-isocyanatomethyloctane or 2-isocyanatoethyl (2S)-2,6-diisocyanatohexanoate (common name lysine triisocyanate), with 1,8-diisocyanato isocyanatomethyloctane being especially preferred for use.

Likewise, from the viewpoint of the chipping resistance, adhesiveness and finished outer appearance of the multilayer coating film that is formed, the aliphatic triisocyanate compound (b1) has a viscosity at 23° C. in the range of preferably 1 to 50 mPa·s and more preferably 1 to 30 mPa·s.

According to the invention, from the viewpoint of the chipping resistance, adhesiveness and finished outer appearance of the multilayer coating film that is formed, the content ratio of the aliphatic triisocyanate compound (b1) in the polyisocyanate compound (b) is suitably in the range of 5 to 100 mass %, preferably 5 to 99 mass % and more preferably 10 to 60 mass %, and especially preferably in the range of 10 to 40 mass %, based on the total solid content of the polyisocyanate compound (b).

The clear coating material (Z) of the invention is a coating composition containing a hydroxyl group-containing acrylic resin (a) and a polyisocyanate compound (b), where the polyisocyanate compound (b) contains an aliphatic triisocyanate compound (b1) with a molecular weight in the range of 200 to 350 as at least one of its types.

From the viewpoint of the chipping resistance, adhesiveness and finished appearance of the multilayer coating film that is formed, the contents of the hydroxyl group-containing acrylic resin (a), polyisocyanate compound (b) and aliphatic triisocyanate compound (b1) with a molecular weight in the range of 200 to 350 in the clear coating material (Z) are preferably in the following ranges, based on 100 parts by mass of the total solid content of the hydroxyl group-containing acrylic resin (a) and polyisocyanate compound (b).

Hydroxyl group-containing acrylic resin (a): 30 to 90 parts by mass, preferably 40 to 80 parts by mass and more preferably 50 to 70 parts by mass, Polyisocyanate compound (b): 10 to 70 parts by mass, preferably 20 to 60 parts by mass and more preferably 30 to 50 parts by mass, and Aliphatic triisocyanate compound (b1) with molecular weight in the range of 200 to 350:1 to 70 parts by mass, preferably 3 to 40 parts by mass and more preferably 3 to 30 parts by mass.

For the clear coating material (Z), the equivalent ratio (NCO/OH) of the total number of moles of isocyanate groups in the polyisocyanate compound (b) and the total number of moles of hydroxyl groups in the hydroxyl group-containing resin (a) is suitably in the range of 1.3 to 2.5, preferably 1.5 to 2.3 and more preferably 1.5 to 2.0, from the viewpoint of the chipping resistance, adhesiveness and finished outer appearance of the multilayer coating film that is formed.

For the clear coating material (Z), the equivalent ratio (NCO/OH) of the total number of moles of isocyanate groups in the aliphatic triisocyanate compound (b1) with a molecular weight in the range of 200 to 350 and the total number of moles of hydroxyl groups in the hydroxyl group-containing acrylic resin (a) is suitably in the range of 0.2 to 2.5, preferably 0.3 to 1.8 and more preferably 0.3 to 1.2, from the viewpoint of the chipping resistance, adhesiveness and finished outer appearance of the multilayer coating film that is formed.

The reason why a multilayer coating film with excellent chipping resistance, adhesiveness and finished outer appearance is formed by the method for forming a multilayer coating film of the invention is not fully understood, but it is conjectured that a multilayer coating film with excellent chipping resistance and adhesiveness is formed because the aliphatic triisocyanate compound (b1) in the clear coating material (Z) permeates into the second coloring coating film and into the first coloring coating film below the second coloring coating film, due to the relatively low molecular weight of the aliphatic triisocyanate compound (b1), and the permeated aliphatic triisocyanate compound (b1) reacts with the hydroxyl groups of the hydroxyl group-containing resin (a) in the clear coating material (Z), the hydroxyl groups of the hydroxyl group-containing resin (y1) in the second coloring coating material (Y) and the hydroxyl groups of the hydroxyl group-containing resin (x1) in the first coloring coating material (X), forming a firm crosslinked multilayer coating film. Presumably, the permeated aliphatic triisocyanate compound (b1) increases the curing speed of the first coloring coating film and second coloring coating film, thus reducing the difference from the curing speed of the clear coating film, so that a multilayer coating film with an excellent finished outer appearance is formed.

It is also conjectured that since the clear coating material (Z) contains the aliphatic triisocyanate compound (b1) with relatively low viscosity as at least one type of the polyisocyanate compound (b), the flow property of the clear coating material (Z) is improved and a multilayer coating film with excellent finished outer appearance is therefore formed.

If necessary, the clear coating material (Z) may further contain a polyisocyanate compound other than the aliphatic triisocyanate compound (b1) with a molecular weight in the range of 200 to 350, as the polyisocyanate compound (b).

Polyisocyanate Compound Other than Aliphatic Triisocyanate Compound (b1)

Examples of polyisocyanate compounds other than the aliphatic triisocyanate compound (b1) include aliphatic polyisocyanate compounds other than the aliphatic triisocyanate compound (b1), alicyclic polyisocyanate compounds, araliphatic polyisocyanate compounds, aromatic polyisocyanate compounds and derivatives of these polyisocyanate compounds.

Examples of aliphatic polyisocyanate compounds other than the aliphatic triisocyanate compound (b1) include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name lysine diisocyanate).

Examples of alicyclic polyisocyanate compounds include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name hydrogenated xylylene diisocyanate) or its mixtures, and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-dniisocyanatomethyl)-bicyclo(2.2.1)heptane, 2-(3-isocyanatopropyl)-2,6-dniisocyanatomethyl)-bicyclo(2.2.1)heptane, 3-(3-isocyanatopropyl)-2,5-dniisocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1) heptane.

Examples of araliphatic polyisocyanate compounds include araliphatic diisocyanates such as 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and araliphatic triisocyanates such as 1,3,5-triisocyanatomethylbenzene.

Examples of aromatic polyisocyanate compounds include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or their mixtures, 2,4- or 2,6-tolylene diisocyanate or their mixtures, 4,4'-toluidine diisocyanate and 4,4'-diphenylether diisocyanate; aromatic triisocyanates such as triphenylmethane-4,4',4''-triisocyanate, 1,3,5-triisocyanatobenzene, 2,4,6-triisocyanatotoluene; and aromatic tetraisocyanates such as 4,4'-diphenylmethane-2,2',5,5'-tetraisocyanate.

Examples of the aforementioned polyisocyanate compound derivatives include the aforementioned polyisocyanate compound dimers, trimers, biurets, allophanates, carbodiimides, urethodiones, urethoimines, isocyanurates, oxadiazinetriones, polymethylenepolyphenyl polyisocyanate (crude MDI, polymeric MDI) and crude TDI.

From the viewpoint of the coated film hardness and finished appearance of the multilayer coating film that is formed, the polyisocyanate compound other than the aliphatic triisocyanate compound (b1) preferably has a polyisocyanate compound (b2) with a molecular weight in the range of 500 to 2000, as at least one of its types.

Polyisocyanate Compound (b2)

The polyisocyanate compound (b2) is a polyisocyanate compound having a molecular weight in the range of 500 to 2000. From the viewpoint of the coated film hardness and finished appearance of the multilayer coating film that is formed, the molecular weight is preferably in the range of 500 to 1500 and more preferably 500 to 1000.

Examples for the polyisocyanate compound (b2) include isocyanurates of hexamethylene diisocyanate, isocyanurates of isophorone diisocyanate, biurets of hexamethylene diisocyanate, and allophanates of hexamethylene diisocyanate, any of which may be used alone or in combinations of two or more. From the viewpoint of the coated film hardness and finished appearance of the multilayer coating film that is formed, the polyisocyanate compound (b2) used is preferably an isocyanurate of hexamethylene diisocyanate.

When the clear coating material (Z) contains a polyisocyanate compound (b2), the content of the polyisocyanate compound (b2) is suitably in the range of 1 to 95 parts by mass, preferably 40 to 90 parts by mass and more preferably 60 to 90 parts by mass, based on 100 parts by mass as the total solid content of the hydroxyl group-containing acrylic resin (a) and the polyisocyanate compound (b), from the viewpoint of the chipping resistance, adhesiveness, coated film hardness and finished outer appearance of the multilayer coating film that is formed.

When the clear coating material (Z) contains a polyisocyanate compound (b2), the equivalent ratio (NCO/OH) of the total number of moles of isocyanate groups in the polyisocyanate compound (b2) and the total number of moles of hydroxyl groups in the hydroxyl group-containing resin (a) is suitably in the range of 1.2 or lower, preferably 0.5 to 1.2 and more preferably 0.8 to 1.2, from the viewpoint of the chipping resistance, adhesiveness and finished outer appearance of the multilayer coating film that is formed.

When the clear coating material (Z) contains a polyisocyanate compound (b2), the content ratio of the aliphatic triisocyanate compound (b1) and the polyisocyanate compound (b2) is suitably such that (b1)/(b2)=5/95 to 99/1, preferably 10/90 to 60/40 and more preferably 10/90 to 40/60, as the mass ratio of the aliphatic triisocyanate compound (b1)/polyisocyanate compound (b2), from the viewpoint of the chipping resistance, adhesiveness, coated film hardness and finished outer appearance of the multilayer coating film that is formed.

It is not fully understood why a multilayer coating film with excellent coated film hardness and finished appearance is formed by the method for forming a multilayer coating film of the invention when the clear coating material (Z) contains the polyisocyanate compound (b2), but it is conjectured that the polyisocyanate compound (b2) is less able to permeate into the lower layer than the aliphatic triisocyanate compound (b1) because of its high molecular weight, and consequently more of it remains in the clear coating film, reacting with the hydroxyl groups in the hydroxyl group-containing resin (a) to form a firm crosslinked coating film, and thereby improving the coated film hardness. Presumably, since the molecular weight of the polyisocyanate compound (b2) is not too high, an excellent flow property is obtained and a multilayer coating film with an excellent finished appearance is formed.

Other Components

The clear coating material (Z) may also contain a resin other than a hydroxyl group-containing acrylic resin (a), if necessary. Examples of resins other than the hydroxyl group-containing acrylic resin (a) include acrylic resins without hydroxyl groups, polyester resins optionally with hydroxyl groups, polyurethane resins optionally with hydroxyl groups, polyether resins optionally with hydroxyl groups, and polycarbonate resins optionally with hydroxyl groups. It is preferred to use a hydroxyl group-containing polyester resin or a hydroxyl group-containing polyurethane resin.

The hydroxyl group-containing polyester resin and hydroxyl group-containing polyurethane resin can be produced, for example, by the method described for the hydroxyl group-containing polyester resin (x12) or for the hydroxyl group-containing polyurethane resin (x13).

When the clear coating material (Z) contains a resin other than the hydroxyl group-containing acrylic resin (a), the content of the resin other than the hydroxyl group-containing acrylic resin (a) is suitably in the range of 50 parts by mass or lower and preferably 1 to 20 parts by mass with respect to 100 parts by mass of the solid content of the hydroxyl group-containing acrylic resin (a).

The clear coating material (Z) may also contain color pigments, luster pigments, extender pigments, dyes, ultraviolet absorbers, light stabilizers, catalysts, organic solvents, antifoaming agents, viscosity adjustors, rust-preventive agents and surface control agents, as necessary and appropriate.

Examples of color pigments include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like.

Luster pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica.

Examples of extender pigments include talc, clay, kaolin, barium sulfate, barium carbonate, calcium carbonate, silica and alumina white.

These pigments may be used alone or in combinations of two or more.

When the clear coating material (Z) contains a pigment, the pigment content is preferably an amount that does not interfere with the transparency of the obtained coating film, and it is usually preferred to be in the range of 0.1 to 20 parts by mass, especially 0.3 to 10 parts by mass and most especially 0.5 to 5 parts by mass, for example, based on 100 parts by mass of the solid resin content in the clear coating material (Z).

Conventionally known ultraviolet absorbers may also be used, and examples include ultraviolet absorbers such as benzotriazole-based absorbers, triazine-based absorbers, salicylic acid derivative-based absorbers and benzophenone-based absorbers. Any of these may be used alone or in combinations of two or more.

When the clear coating material (Z) contains an ultraviolet absorber, the ultraviolet absorber content is usually preferred to be in the range of 0.1 to 10 parts by mass, especially 0.2 to 5 parts by mass and most especially 0.3 to 2 parts by mass, based on 100 parts by mass of the solid resin content in the clear coating material (Z).

Conventionally known light stabilizers may also be used, of which examples include hindered amine-based light stabilizers.

As hindered amine-based light stabilizers it is preferred to use hindered amine-based light stabilizers with low basicity, from the viewpoint of pot life. Such hindered amine-based light stabilizers include acylated hindered amines and amino ether-based hindered amines, and specifically "HOSTAVIN 3058" (trade name of Clariant Japan) and "TINUVIN 123" (trade name of BASF Corp.).

When the clear coating material (Z) contains a light stabilizer, the light stabilizer content is usually preferred to be in the range of 0.1 to 10 parts by mass, especially 0.2 to 5 parts by mass and most especially 0.3 to 2 parts by mass, based on 100 parts by mass of the solid resin content in the clear coating material (Z).

The catalyst used may be a conventionally known one, and it may contain a urethanating reaction catalyst, for example.

Specific examples of urethanating reaction catalysts include organometallic compounds such as tin octylate, dibutyltin diacetate, dibutyltin di(2-ethyl hexanoate), dibutyltin dilaurate, dioctyltin diacetate, dioctyltin di(2-ethyl hexanoate), dibutyltin oxide, dibutyltin sulfide, dioctyltin oxide, dibutyltin fatty acid salts, lead 2-ethylhexanoate, zinc octylate, zinc naphthenate, fatty acid zinc compounds, bismuth octanoate, bismuth 2-ethylhexanoate, bismuth oleate, bismuth neodecanoate, bismuth versatate, bismuth naphthenate, cobalt naphthenate, calcium octylate, copper naphthenate and tetra(2-ethylhexyl)titanate; and tertiary amines, any of which may be used alone or in combinations of two or more.

When the clear coating material (Z) contains a urethanating reaction catalyst, the urethanating reaction catalyst content is usually preferred to be in the range of 0.005 to 2 parts by mass, and especially 0.01 to 1 part by mass, based on 100 parts by mass of the solid resin content in the clear coating material (Z).

When the clear coating material (Z) contains a urethanating reaction catalyst, the clear coating material (Z) may contain an organic acid such as acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, laurylic acid, palmitic acid, stearic acid, oleic acid, linoleic acid, neodecanoic acid, versatic acid, isobutyric anhydride, itaconic anhydride, acetic anhydride, citraconic anhydride, propionic anhydride, maleic anhydride, butyric anhydride, citric anhydride, trimellitic anhydride, pyromellitic anhydride or phthalic anhydride; an inorganic acid such as hydrochloric acid or phosphoric acid; and/or a metal coordinating compound such as acetylacetone or an imidazole-based compound, from the viewpoint of storage stability and curability.

Examples of organic solvents include aromatic solvents such as toluene, xylene and "SWAZOLE 1000" (high boiling point petroleum-based solvent, trade name of Cosmo Oil Co., Ltd.); aliphatic solvents such as mineral spirits; ester-based solvents such as ethyl acetate, butyl acetate, propyl propionate, butyl propionate, 1-methoxy-2-propyl acetate, 2-ethoxyethyl propionate, 3-methoxybutyl acetate, ethyleneglycol ethyl ether acetate and propyleneglycol methyl ether acetate; ketone-based solvents such as methyl ethyl ketone, methylisobutyl ketone and methyl amyl ketone; and alcohol-based solvents such as isopropanol, n-butanol, isobutanol and 2-ethylhexanol.

From the viewpoint of storage stability, the clear coating material (Z) is preferably a two-component coating material in which the hydroxyl group-containing acrylic resin (a) and the polyisocyanate compound (b) are separated, with both preferably being mixed together just before use.

Method of Applying Clear Coating Material (Z)

The method of applying the clear coating material (Z) is not particularly restricted, and for example, a wet coating film may be formed by a method such as air spray coating, airless spray coating, rotary atomizing coating or curtain coating. An electrostatic charge may also be applied if necessary in these coating methods. Air spray coating and rotary atomizing coating are especially preferred. The coating amount of the clear coating material (Z) is usually preferred to be an amount that produces a cured film thickness of 10 to 50 µm and preferably 20 to 40 µm.

When carrying out air spray coating, airless spray coating or rotary atomizing coating, the viscosity of the clear coating material (Z) is preferably adjusted as appropriate using an organic solvent or other solvent to within a suitable viscosity range for coating, which will usually be a viscosity range of about 15 to 60 seconds and especially 20 to 40 seconds at 20° C., as measured with a No. 4 Ford cup viscometer.

Step (4)

In the method for forming a multilayer coating film of the invention, the first coloring coating film, second coloring coating film and clear coating film formed in steps (1) to (3) described above are heat cured at the same time.

Curing of the first coloring coating film, second coloring coating film and clear coating film can be carried out by common coating film heating means, such as hot air heating, infrared heating or high-frequency heating.

The heating temperature is not particularly restricted and heating may be carried out at about 60 to 160° C., for example, but since the method for forming a multilayer coating film of the invention has the advantage of allowing formation of a multilayer coating film with excellent chipping resistance, adhesiveness and finished outer appearance even with a relatively low heating temperature, the heating temperature is suitably in the range of 60 to 120° C., preferably 60 to 100° C. and more preferably 70 to 90° C. from the viewpoint of energy savings. More specifically, the method for forming a multilayer coating film of the invention has the advantage of allowing formation of a multilayer coating film with excellent chipping resistance, adhesiveness and finished outer appearance in a 3-coat, 1-bake system, even when the heating temperature in the baking and curing step has been relatively lowered.

The heating time is not particularly restricted but is suitably in the range of 5 to 60 minutes, preferably 10 to 50 minutes and more preferably 15 to 40 minutes, for example.

Since the present method allows a multilayer coating film with excellent chipping resistance, adhesiveness and finished outer appearance to be obtained, it is most particularly suitable for use as a method for forming a multilayer coating film on an automobile body.

EXAMPLES

The present invention will now be explained in greater detail using production examples, examples and comparative examples. The production examples, examples and comparative examples are merely for illustration and are not intended to limit the scope of the invention. Throughout the production examples, examples and comparative examples, the "parts" and "%" values are based on mass, unless otherwise specified. Also, the film thicknesses of the coating films are based on the cured coating films.

Production of Hydroxyl Group-Containing Resin (x1)
Production of Hydroxyl Group-Containing Acrylic Resin (x11)

Production Example 1

In a reactor equipped with a thermometer, thermostat, stirrer, reflux condenser and dropper there were charged 70.7 parts of deionized water and 0.52 part of AQUALON KH-10 (trade name of Dai-ichi Kogyo Seiyaku Co., Ltd., emulsifying agent, 97% active ingredient), and then the mixture was stirred under a nitrogen stream and the temperature was increased to 80° C. Next, 1% of the total monomer emulsion described below and 5 parts of a 6% ammonium persulfate aqueous solution were introduced into the reactor, and the mixture was kept at 80° C. for 15 minutes. Next, the remainder of the monomer emulsion was added dropwise into the reactor kept at the same temperature over a period of 3 hours, and upon completion of the dropwise addition it was aged for 1 hour, after which the mixture was cooled to 30° C. while gradually adding 40 parts of a 5% 2-(dimethylamino)ethanol aqueous solution to the reactor, and discharged while filtering with a 100 mesh nylon cloth, to obtain a hydroxyl group-containing acrylic resin emulsion (x11-1) with a solid concentration of 45%. The hydroxyl value of the obtained hydroxyl group-containing acrylic resin was 43 mgKOH/g and the acid value was 12 mgKOH/g.

Monomer emulsion: 50 parts of deionized water, 10 parts of styrene, 40 parts of methyl methacrylate, 35 parts of ethyl acrylate, 3.5 parts of n-butyl methacrylate, 10 parts of 2-hydroxyethyl methacrylate, 1.5 parts of acrylic acid, 1.0 part of "AQUALON KH-10" and 0.03 part of ammonium persulfate were mixed and stirred to obtain a monomer emulsion.

Production Example 2

After charging 15 parts of ethyl-3-ethoxypropionate and 15 parts of n-butyl propionate into a reactor equipped with a thermometer, thermostat, stirrer, reflux condenser, nitrogen inlet tube and dropper, and increasing the temperature to 155° C., a monomer mixture comprising 15 parts of styrene, 25 parts of methyl methacrylate, 24 parts of isobornyl acrylate, 10 parts of 2-ethylhexyl acrylate, 25 parts of 2-hydroxyethyl acrylate, 1 part of acrylic acid and 4.5 parts of 2,2-di(t-amylperoxy)butane (polymerization initiator) was added dropwise over a period of 5 hours, and upon completion of the dropwise addition, the mixture was aged for 2 hours to obtain a hydroxyl group-containing acrylic resin solution (x11-2) with a solid content of 75%. The hydroxyl value of the obtained hydroxyl group-containing acrylic resin was 121 mgKOH/g and the acid value was 7.8 mgKOH/g.

Production of Hydroxyl Group-Containing Polyester Resin (x12)

Production Example 3

Into a reactor equipped with a thermometer, thermostat, stirrer, reflux condenser and water separator there were charged 174 parts of trimethylolpropane, 327 parts of neopentyl glycol, 352 parts of adipic acid, 109 parts of isophthalic acid and 101 parts of 1,2-cyclohexanedicarboxylic anhydride, and after heating from 160° C. to 230° C. over a period of 3 hours, the condensation water produced was distilled off with a water separator while maintaining a temperature of 230° C., and reaction was conducted until the acid value fell below 3 mgKOH/g. To this reaction product there was added 59 parts of trimellitic anhydride, and after addition reaction at 170° C. for 30 minutes, it was cooled to below 50° C., 2-(dimethylamino)ethanol was added in an amount equivalent to the acid groups for neutralization, and then deionized water was slowly added to obtain a hydroxyl group-containing polyester resin solution (x12-1) solution with a solid concentration of 45% and a pH of 7.2. The hydroxyl value of the obtained hydroxyl group-containing polyester resin was 128 mgKOH/g, the acid value was 35 mgKOH/g and the weight-average molecular weight was 13,000.

Production Example 4

After heating 107.8 parts of 1,2-cyclohexanedicarboxylic anhydride, 85.8 parts of 1,6-hexane and 71.3 parts of tris (2-hydroxyethyl)isocyanuric acid to 230° C. in a reactor equipped with a thermometer, thermostat, stirrer, reflux condenser and water separator, in the presence of 0.063 part of dibutyltin oxide as an esterification catalyst, and maintaining the temperature for 1 hour, xylene was added and the mixture was refluxed at the same temperature while distilling off the water for about 6 hours, to obtain a hydroxyl group-containing polyester resin solution (x12-2) with a solid concentration of 72%. The hydroxyl value of the obtained hydroxyl group-containing polyester resin was 194 mgKOH/g, the acid value was 2 mgKOH/g and the weight-average molecular weight was 8,000.

Production of Pigment-Dispersed Paste

Production Example 5

After mixing 56 parts of the hydroxyl group-containing polyester resin solution (x12-1) obtained in Production Example 3 (25 parts solid content), 60 parts of "JR-806" (trade name of Tayca Corp., rutile titanium dioxide), 1 part of "carbon MA-100" (trade name of Mitsubishi Chemical Corp., carbon black), 15 parts of "BARIACE B-35" (trade name of Sakai Chemical Industry Co., Ltd., barium sulfate powder), 3 parts of "MICRO ACE S-3" (trade name of Nippon Talc Co., Ltd., talc powder) and 5 parts of deionized water, the mixture was adjusted to pH 8.0 with 2-(dimethylamino)ethanol. Next, the obtained liquid mixture was placed in a wide-mouth glass bottle, glass beads of approximately 1.3 min φ diameter were added as a dispersion medium, the bottle was sealed, and the mixture was dispersed for 30 minutes with a paint shaker to obtain a pigment-dispersed paste (P-1).

Production Example 6

After mixing 56 parts of the hydroxyl group-containing polyester resin solution (x12-1) obtained in Production Example 3 (25 parts solid content), 60 parts of "JR-806" (trade name of Tayca Corp., rutile titanium dioxide), 1 part of "carbon MA-100" (trade name of Mitsubishi Chemical Corp., carbon black), 15 parts of "BARIACE B-35" (trade name of Sakai Chemical Industry Co., Ltd., barium sulfate powder) and 5 parts of deionized water, the mixture was adjusted to pH 8.0 with 2-(dimethylamino)ethanol. Next, the obtained liquid mixture was placed in a wide-mouth glass bottle, glass beads of approximately 1.3 min φ diameter were added as a dispersion medium, the bottle was sealed, and the mixture was dispersed for 30 minutes with a paint shaker to obtain a pigment-dispersed paste (P-2).

Production Example 7

There were mixed 40 parts of the hydroxyl group-containing acrylic resin solution (x11-2) obtained in Production Example 2 (30 parts solid content), 60 parts of "JR-806" (trade name of Tayca Corp., rutile titanium dioxide), 1 part of "Carbon MA-100" (trade name of Mitsubishi Chemical Corp., carbon black), 15 parts of "BARIACE B-35" (trade name of Sakai Chemical Industry Co., Ltd., barium sulfate powder), 3 parts of "MICRO ACE S-3" (trade name of Nippon Talc Co., Ltd., talc powder) and 10 parts of xylene. Next, the obtained liquid mixture was placed in a wide-mouth glass bottle, glass beads of approximately 1.3 min φ diameter were added as a dispersion medium, the bottle was sealed, and the mixture was dispersed for 30 minutes with a paint shaker to obtain a pigment-dispersed paste (P-3).

Production of First Coloring Coating Material (X)

Production Example 8

There were uniformly mixed 140 parts of the pigment-dispersed paste (P-1) obtained in Production Example 5, 25 parts of the hydroxyl group-containing acrylic resin emulsion (x11-1) obtained in Production Example 1 (11 parts solid content), 20 parts of the polyester resin solution (x12-1) obtained in Production Example 3 (9 parts solid content), 78 parts of "BAYHYDUR VPLS2310" (trade name of Sumika Bayer Urethane Co., Ltd., blocked polyisocyanate compound, solid content: 38%) (30 parts solid content), and 72 parts of "UCOAT UX-8100" (trade name of Sanyo Chemical Industries, Ltd., urethane emulsion, solid content: 35%) (25 parts solid content). To the obtained mixture there were then added "UH-752" (trade name of Adeka Corp., thickening agent), 2-(dimethylamino)ethanol and deionized water, to obtain an aqueous first coloring coating material (X-1) having pH 8.0, a coating material solid content of 48%, and a viscosity of 30 seconds with a Ford cup No. 4 at 20° C.

Production Example 9

There were uniformly mixed 137 parts of the pigment-dispersed paste (P-2) obtained in Production Example 6, 25 parts of the hydroxyl group-containing acrylic resin emulsion (x11-1) obtained in Production Example 1 (11 parts solid content), 20 parts of the polyester resin solution (x12-1) obtained in Production Example 3 (9 parts solid content), 78 parts of "BAYHYDUR VPLS2310" (trade name of Sumika Bayer Urethane Co., Ltd., blocked polyisocyanate compound, solid content: 38%) (30 parts solid content), and 72 parts of "UCOAT UX-8100" (trade name of Sanyo Chemical Industries, Ltd., urethane emulsion, solid content: 35%) (25 parts solid content). To the obtained mixture there were then added "UH-752" (trade name of Adeka Corp., thickening agent), 2-(dimethylamino)ethanol and deionized water, to obtain an aqueous first coloring coating material (X-2) having pH 8.0, a coating material solid content of 48%, and a viscosity of 30 seconds with a Ford cup No. 4 at 20° C.

Production Example 10

There were uniformly mixed 129 parts of the pigment-dispersed paste (P-3) obtained in Production Example 7, 56 parts of the hydroxyl group-containing polyester resin solution (X12-2) obtained in Production Example 4 (40 parts solid content) and 50 parts of "DURANATE MF-K60B" (trade name of Asahi Kasei Corp., blocked polyisocyanate compound, solid content: 60%) (30 parts solid content). Xylene was then added to the obtained mixture and the viscosity with a No. 4 Ford cup at 20° C. was adjusted to 30 seconds, to obtain an organic solvent-type first coloring coating material (X-3).

Production of Hydroxyl Group-Containing Resin (y1)
Production of Hydroxyl Group-Containing Acrylic Resin (y11)

Production Example 11

After charging 130 parts of deionized water and 0.52 part of AQUALON KH-10 into a reactor equipped with a thermometer, thermostat, stirrer, reflux condenser and dropper, the mixture was stirred under a nitrogen stream and the temperature was increased to 80° C. Next, 1% of the total monomer emulsion (1) described below and 5.3 parts of a 6% ammonium persulfate aqueous solution were introduced into the reactor, and the mixture was kept at 80° C. for 15 minutes. The remainder of the monomer emulsion (1) was then added dropwise into the reactor kept at the same temperature over a period of 3 hours, and upon completion of the dropwise addition, the mixture was aged for 1 hour. Next, the remainder of the monomer emulsion (2) was added dropwise over a period of 1 hour, and after aging for 1 hour, the mixture was cooled to 30° C. while gradually adding 40 parts of a 5% dimethylethanolamine aqueous solution to the reactor, and discharged while filtering with a 100 mesh nylon cloth, to obtain a hydroxyl group-containing acrylic resin emulsion (y11-1) with a solid concentration of 30%. The hydroxyl value of the obtained hydroxyl group-containing acrylic resin was 25 mgKOH/g and the acid value was 33 mgKOH/g.

Monomer emulsion (1): 42 parts deionized water, 0.72 part AQUALON KH-10, 2.1 parts methylenebisacrylamide, 2.8 parts styrene, 16.1 parts methyl methacrylate, 28 parts ethyl acrylate and 21 parts n-butyl acrylate were mixed and stirred to obtain monomer emulsion (1).

Monomer emulsion (2): 18 parts deionized water, 0.31 part AQUALON KH-10, 0.03 part ammonium persulfate, 5.1 parts methacrylic acid, 5.1 parts 2-hydroxyethyl acrylate, 3 parts styrene, 6 parts methyl methacrylate, 1.8 parts ethyl acrylate and 9 parts n-butyl acrylate were mixed and stirred to obtain monomer emulsion (2).

Production Example 12

After charging 15 parts of ethyl-3-ethoxypropionate and 15 parts of n-butyl propionate into a reactor equipped with a thermometer, thermostat, stirrer, reflux condenser, nitrogen inlet tube and dropper, and increasing the temperature to 155° C., a monomer mixture comprising 25 parts of styrene, 15 parts of methyl methacrylate, 20 parts of isobornyl acrylate, 14 parts of 2-ethylhexyl acrylate, 25 parts of 2-hydroxyethyl acrylate, 1 part of acrylic acid and 4.5 parts of 2,2-di(t-amylperoxy)butane (polymerization initiator) was added dropwise over a period of 5 hours, and upon completion of the dropwise addition, the mixture was aged for 2 hours to obtain a hydroxyl group-containing acrylic resin solution (y11-2) with a solid content of 75%. The hydroxyl value of the obtained hydroxyl group-containing acrylic resin was 121 mgKOH/g and the acid value was 7.8 mgKOH/g.

Production of Hydroxyl Group-Containing Polyester Resin (y12)

Production Example 13

After charging and heating 109 parts of trimethylolpropane, 141 parts of 1,6-hexanediol, 126 parts of hexahydrophthalic anhydride and 120 parts of adipic acid into a reactor equipped with a thermometer, thermostat, stirrer, reflux condenser and water separator, and heating from 160° C. to 230° C. for a period of 3 hours, condensation reaction was conducted at 230° C. for 4 hours. Next, 38.3 parts of trimellitic anhydride was further added for addition of carboxyl groups to the obtained condensation reaction product, reaction was conducted at 170° C. for 30 minutes, and then dilution was performed with 2-ethyl-1-hexanol to obtain a hydroxyl group-containing polyester resin (y12-1) with a solid concentration of 70%. The hydroxyl value of the obtained hydroxyl group-containing polyester resin was 150 mgKOH/g, the acid value was 46 mgKOH/g and the weight-average molecular weight was 6,400.

Production of Luster Pigment Dispersion

Production Example 14

In a stirring and mixing container there were uniformly mixed 19 parts of the aluminum pigment paste GX-180A (trade name of Asahi Kasei Metals Co., Ltd., metal content: 74%) (14 parts solid content), 35 parts of 2-ethyl-1-hexanol, 8 parts of a phosphate group-containing resin solution and 0.2 part of 2-(dimethylamino)ethanol, to obtain luster pigment concentrate (P-4).

Phosphate group-containing resin solution: After placing a mixed solvent of 27.5 parts of methoxypropanol and 27.5 parts of isobutanol in a reactor equipped with a thermometer, thermostat, stirrer, reflux condenser and dropper, and heating to 110° C., 121.5 parts of a mixture comprising 25 parts of styrene, 27.5 parts of n-butyl methacrylate, 20 parts of "Isostearyl acrylate" (trade name of Osaka Organic Chemical Industry, Ltd., branched higher alkyl acrylate), 7.5 parts of 4-hydroxybutyl acrylate, 15 parts of a phosphate group-containing polymerizable monomer, 12.5 parts of 2-methacryloyloxyethyl acid phosphate, 10 parts of isobutanol and 4 parts of t-butyl peroxyoctanoate was added to the mixed solvent over a period of 4 hours, and then a mixture of 0.5 part of t-butyl peroxyoctanoate and 20 parts of isopropanol was added dropwise over a period of 1 hour. The mixture was then aged while stirring for 1 hour to obtain a phosphate group-containing resin solution with a solid concentration of 50%. The acid value due to the phosphate groups of the resin was 83 mgKOH/g, the hydroxyl value was 29 mgKOH/g and the weight-average molecular weight was 10,000.

Phosphate group-containing polymerizable monomer: After placing 57.5 parts of monobutylphosphoric acid and 41 parts of isobutanol in a reactor equipped with a thermometer, thermostat, stirrer, reflux condenser and dropper and heating them to 90° C., 42.5 parts of glycidyl methacrylate was added dropwise over a period of 2 hours, and the mixture was further stirred and aged for 1 hour. Next, 59 parts of isopropanol was added to obtain a phosphate group-containing polymerizable monomer solution with a solid concentration of 50%. The acid value due to the phosphate groups in the obtained monomer was 285 mgKOH/g.

Production of Second Coloring Coating Material (Y)

Production Example 15

There were uniformly mixed 100 parts of the acrylic resin emulsion (y11-1) obtained in Production Example 11 (30 parts solid content), 30 parts of the polyester resin solution (y12-1) obtained in Production Example 13 (21 parts solid content), 62 parts of the luster pigment dispersion (P-4) obtained in Production Example 14, 70 parts of "BAYHYDUR VPLS2310" (trade name of Sumika Bayer Urethane Co., Ltd., blocked polyisocyanate compound, solid content: 38%) (27 parts solid content) and 65 parts of "UCOAT UX-8100" (trade name of Sanyo Chemical Industries, Ltd., urethane emulsion, solid content: 35%) (23 parts solid content), and there were further added "PRIMAL ASE-60" (trade name of Rohm & Haas, thickening agent), 2-(dimethylamino)ethanol and deionized water, to obtain an aqueous second coloring coating material (Y-1) having pH 8.0, a solid content of 25% and a viscosity of 40 seconds with a Ford cup No. 4 at 20° C.

Production Example 16

There were uniformly mixed 40 parts of the hydroxyl group-containing acrylic resin solution (y11-2) obtained in Production Example 12 (30 parts solid content), 56 parts of the hydroxyl group-containing polyester resin solution (x12-2) obtained in Production Example 4 (40 parts solid content), 50 parts of "DURANATE MF-K60B" (trade name of Asahi Kasei Corp., blocked polyisocyanate compound, solid content: 60%) (30 parts solid content), 30 parts of "SWAZOLE 1500" (trade name of Cosmo Oil Co., Ltd., petroleum-based aromatic hydrocarbon-based solvent) and 19 parts of the aluminum pigment paste "GX-180A" (trade name of Asahi Kasei Metals Co., Ltd., metal content: 74%). Next, xylene was added to the obtained mixture and the viscosity with a No. 4 Ford cup at 20° C. was adjusted to 30 seconds, to obtain an organic solvent-type second coloring coating material (Y-2).

Production of Hydroxyl Group-Containing Acrylic Resin (a)

Production Example 17

In a reactor equipped with a thermometer, thermostat, stirrer, reflux condenser, nitrogen inlet tube and dropper there were charged 27 parts of "SWAZOLE 1000" (trade name of Cosmo Oil Co., Ltd., aromatic organic solvent) and 5 parts of propyleneglycol monomethylether acetate, the mixture was stirred at 150° C. while blowing in nitrogen gas, and then a monomer mixture comprising 20 parts of styrene, 32.5 parts of 2-hydroxypropyl acrylate, 46.8 parts of isobutyl methacrylate, 0.7 part of acrylic acid and 6.0 parts of di-tertiary amyl peroxide (polymerization initiator) was added dropwise at an even rate over a period of 4 hours. After then ageing at 150° C. for 1 hour and cooling, 21 parts of isobutyl acetate was further added for dilution to obtain a hydroxyl group-containing acrylic resin (a-1) with a solid concentration of 65 mass %. The hydroxyl value of the obtained hydroxyl group-containing acrylic resin (a-1) was 139 mgKOH/g, the acid value was 5.5 mgKOH/g, the weight-average molecular weight was 5,500 and the glass transition temperature was 38° C.

Production of Clear Coating Material (Z)

Production Example 18

A base compound comprising a homogeneous mixture of 94 parts of the hydroxyl group-containing acrylic resin (a-1) obtained in Production Example 17 (61 parts solid content) and 0.4 part of "BYK-300" (trade name of Byk-Chemie Corp., surface control agent, 52% active ingredient) (0.2 part solid content), and a curing agent containing 19.5 parts of 1,8-diisocyanato-4-isocyanatomethyloctane (solid content: 100%, NCO content: 50%, molecular weight: 251, viscosity: 8 mPa·s at 23° C.) (19.5 parts solid content) and 19.5 parts of "SUMIDUR N3300" trade name of Sumika Covestro Urethane Co., isocyanurate of hexamethylene diisocyanate, solid content: 100%, NCO content: 21.8%) (19.5 parts solid content), were uniformly mixed immediately before coating, and then butyl acetate was added to adjust the viscosity with a Ford cup No. 4 at 20° C. to 30 seconds, to obtain a clear coating material (Z-1).

The 1,8-diisocyanato-4-isocyanatomethyloctane is the polyisocyanate compound (b1), and the "SUMIDUR N3300" is the polyisocyanate compound (b2).

Production Examples 19 to 37

Clear coating materials (Z-2) to (Z-20) each having a viscosity of 30 seconds with a Ford cup No. 4 at 20° C. were obtained in the same manner as Production Example 18, except that the composition was as listed in Table 1-1 to Table 1-4. The compositions listed in Table 1-1 to Table 1-4 are based on the solid mass of each component.

The following are notes (*1) to (*3) for Table 1-1 to Table 1-4.

(*1) Lysine triisocyanate: solid content: 100%, NCO content: 47%, molecular weight: 267, viscosity: 25 mPa·s at 23° C., corresponding to polyisocyanate compound (b1).

(*2) "SUMIDUR N3900": trade name of Sumika Covestro Urethane Co., isocyanate with iminooxadiazinedione group, solid content: 100%, NCO content: 23.5%, corresponding to polyisocyanate compound (b2).

(*3) "SUMIDUR N3400": trade name of Sumika Covestro Urethane Co., urethodione of hexamethylene diisocyanate, solid content: 100%, NCO content: 21.8%, corresponding to polyisocyanate compound (b2).

TABLE 1-1

| | | | Production Example | | | | |
|---|---|---|---|---|---|---|---|
| | | | 18 | 19 | 20 | 21 | 22 |
| Clear coating material (Z) name | | | Z-1 | Z-2 | Z-3 | Z-4 | Z-5 |
| Hydroxyl-containing acrylic resin(a) | | Hydroxyl-containing acrylic resin(a-l) | 61 | 61 | 61 | 61 | 61 |
| Polyisocyanate compound (b) | Aliphatic triisocyanate compound (b1) | 1,8-diisocyanato-4-isocyanatomethyloctane | 19.5 | 15.6 | 11.7 | | 7.8 |
| | | Lysine triisocyanate (*1) | | | | 11.7 | |
| | Polyisocyanate compound other than (b1) | Polyisocyanate compound (b2) with molecular weight in range of 500 to 2000 | SUMIDUR N3300 | 19.5 | 23.4 | 27.3 | 27.3 | 31.2 |
| | | SUMIDUR N3900 (*2) | | | | | |
| | | SUMIDUR N3400 (*3) | | | | | |
| Surface control agent | | BYK-300 | 0.2 | 0.2 | 0.2 | 0.2 | 0.2 |
| Proportion of aliphatic triisocyanate compound (b1) in polyisocyanate compound (b) | | | 50% | 40% | 30% | 30% | 20% |
| Proportion of polyisocyanate compound (b2) in polyisocyanate compound (b) | | | 50% | 60% | 70% | 70% | 80% |
| Equivalent ratio (NCO/OH): Total number moles isocyanate groups in isocyanate compound (b), (b1) or (b2)/total number moles hydroxyl groups in hydroxyl-containing resin (a) | | Aliphatic triisocyanate compound (b1)/hydroxyl-containing acrylic resin(a) | 1.5 | 1.2 | 0.9 | 0.9 | 0.6 |
| | | Polyisocyanate compound (b2)/hydroxyl-containing acrylic resin(a) | 0.7 | 0.8 | 0.9 | 0.9 | 1.1 |
| | | Polyisocyanate compound (b)/hydroxyl-containing acrylic resin(a) | 2.2 | 2.0 | 1.8 | 1.8 | 1.7 |

TABLE 1-2

| | | | Production Example | | | | |
|---|---|---|---|---|---|---|---|
| | | | 23 | 24 | 25 | 26 | 27 |
| Clear coating material (Z) name | | | Z-6 | Z-7 | Z-8 | Z-9 | Z-10 |
| Hydroxyl-containing acrylic resin(a) | | Hydroxyl-containing acrylic resin(a-l) | 61 | 61 | 66 | 57 | 61 |
| Polyisocyanate compound (b) | Aliphatic triisocyanate compound (b1) | 1,8-diisocyanato-4-isocyanatomethyloctane | 3.9 | 27.3 | 10.2 | 12.9 | 19.5 |
| | | Lysine triisocyanate (*1) | | | | | |
| | Polyisocyanate compound other than (b1) | Polyisocyanate compound (b2) with molecular weight in range of 500 to 2000 | SUMIDUR N3300 | 35.1 | 11.7 | 23.8 | 30.1 | 11.7 |
| | | SUMIDUR N3900 (*2) | | | | | 7.8 |
| | | SUMIDUR N3400 (*3) | | | | | |
| Surface control agent | | BYK-300 | 0.2 | 0.2 | 0.2 | 0.2 | 0.2 |
| Proportion of aliphatic triisocyanate compound (b1) in polyisocyanate compound (b) | | | 10% | 70% | 30% | 30% | 50% |
| Proportion of polyisocyanate compound (b2) in polyisocyanate compound (b) | | | 90% | 30% | 70% | 70% | 50% |
| Equivalent ratio (NCO/OH): Total number moles isocyanate groups in isocyanate compound (b), (b1) or (b2)/total number moles hydroxyl groups in hydroxyl-containing resin (a) | | Aliphatic triisocyanate compound (b1)/hydroxyl-containing acrylic resin(a) | 0.3 | 2.2 | 0.7 | 1.1 | 1.5 |
| | | Polyisocyanate compound (b2)/hydroxyl-containing acrylic resin(a) | 1.2 | 0.4 | 0.8 | 1.1 | 0.7 |
| | | Polyisocyanate compound (b)/hydroxyl-containing acrylic resin(a) | 1.5 | 2.6 | 1.5 | 2.2 | 2.2 |

TABLE 1-3

| | | | Production Example | | | | |
|---|---|---|---|---|---|---|---|
| | | | 28 | 29 | 30 | 31 | 32 |
| Clear coating material (Z) name | | | Z-11 | Z-12 | Z-13 | Z-14 | Z-15 |
| Hydroxyl-containing acrylic resin(a) | | Hydroxyl-containing acrylic resin(a-l) | 56 | 56 | 56 | 56 | 56 |
| Polyisocyanate compound (b) | Aliphatic triisocyanate compound (b1) | 1,8-diisocyanato-4-isocyanatomethyloctane Lysine triisocyanate (*1) | | | | | |
| | Polyisocyanate compound other than (b1) | Polyisocyanate compound (b2) with molecular weight in range of 500 to 2000 | | | | | |
| | | SUMIDUR N3300 | 22 | 22 | 44 | | |
| | | SUMIDURN3900 (*2) | 22 | | | 44 | |
| | | SUMIDURN3400 (*3) | | 22 | | | 44 |
| Surface control agent | | BYK-300 | 0.2 | 0.2 | 0.2 | 0.2 | 0.2 |
| Proportion of aliphatic triisocyanate compound (b1) in polyisocyanate compound (b) | | | 0% | 0% | 0% | 0% | 0% |
| Proportion of polyisocyanate compound (b2) in polyisocyanate compound (b) | | | 100% | 100% | 100% | 100% | 100% |
| Equivalent ratio (NCO/OH): Total number moles isocyanate groups in isocyanate compound (b), (b1) or (b2)/total number moles hydroxyl groups in hydroxyl-containing resin (a) | | Aliphatic triisocyanate compound (b1)/hydroxyl-containing acrylic resin(a) | 0 | 0 | 0 | 0 | 0 |
| | | Polyisocyanate compound (b2)/hydroxyl-containing acrylic resin(a) | 1.7 | 1.7 | 1.7 | 1.8 | 1.7 |
| | | Polyisocyanate compound (b)/hydroxyl-containing acrylic resin(a) | 1.7 | 1.7 | 1.7 | 1.8 | 1.7 |

TABLE 1-4

| | | | Production Example | | | | |
|---|---|---|---|---|---|---|---|
| | | | 33 | 34 | 35 | 36 | 37 |
| Clear coating material (Z) name | | | Z-16 | Z-17 | Z-18 | Z-19 | Z-20 |
| Hydroxyl-containing acrylic resin(a) | | Hydroxyl-containing acrylic resin(a-l) | 58 | 52 | 49 | 51 | 49 |
| Polyisocyanate compound (b) | Aliphatic triisocyanate compound (b1) | 1,8-diisocyanato-4-isocyanatomethyloctane Lysine triisocyanate (*1) | | | | | |
| | Polyisocyanate compound other than (b1) | Polyisocyanate compound (b2) with molecular weight in range of 500 to 2000 | | | | | |
| | | SUMIDUR N3300 | 42 | 48 | 51 | | |
| | | SUMIDURN3900 (*2) | | | | 49 | |
| | | SUMIDURN3400 (*3) | | | | | 51 |
| Surface control agent | | BYK-300 | 0.2 | 0.2 | 0.2 | 0.2 | 0.2 |
| Proportion of aliphatic triisocyanate compound (b1) in polyisocyanate compound (b) | | | 0% | 0% | 0% | 0% | 0% |
| Proportion of polyisocyanate compound (b2) in polyisocyanate compound (b) | | | 100% | 100% | 100% | 100% | 100% |
| Equivalent ratio (NCO/OH): Total number moles isocyanate groups in isocyanate compound (b), (b1) or (b2)/total number moles hydroxyl groups in hydroxyl-containing resin (a) | | Aliphatic triisocyanate compound (b1)/hydroxyl-containing acrylic resin(a) | 0 | 0 | 0 | 0 | 0 |
| | | Polyisocyanate compound (b2)/hydroxyl-containing acrylic resin(a) | 1.5 | 1.9 | 2.2 | 2.2 | 2.2 |
| | | Polyisocyanate compound (b)/hydroxyl-containing acrylic resin(a) | 1.5 | 1.9 | 2.2 | 2.2 | 2.2 |

(Fabrication of Articles to be Coated for Testing)

A zinc phosphate-treated cold-rolled steel sheet was electrodeposited with a thermosetting epoxy resin-based cation electrodeposition coating composition (trade name "ELECRON GT-10" by Kansai Paint Co., Ltd.) to a film thickness of 20 μm, and heated at 170° C. for 30 minutes for curing. An article to be coated with an electrodeposition coating formed on the steel sheet was thus fabricated.

(Fabrication of Test Sheet)

Example 1

Each test article to be coated was electrostatically coated with the aqueous first coloring coating material (X-1) obtained in Production Example 8 using a rotary atomizing electrostatic coater to a dry film thickness of 25 μm, and allowed to stand for 5 minutes. The aqueous second coloring coating material (Y-1) obtained in Production Example 15 was then electrostatically coated onto the uncured first coloring coating film using a rotary atomizing electrostatic coater to a dry film thickness of 15 μm, and after being allowed to stand for 5 minutes, it was preheated at 80° C. for 3 minutes. The clear coating material (Z-1) obtained in Production Example 18 was electrostatically coated onto the second coloring coating film to a dry film thickness of 35 μm, and allowed to stand for 7 minutes. It was then heated at 80° C. for 30 minutes to heat and cure the first coloring coating film, second coloring coating film and clear coating film, to prepare each test sheet.

Example 2

The organic solvent first coloring coating material (X-3) obtained in Production Example 10 was electrostatically coated onto each test article to be coated using a rotary atomizing electrostatic coater to a dry film thickness of 25 μm, and allowed to stand for 5 minutes. The organic solvent second coloring coating material (Y-2) obtained in Production Example 16 was then electrostatically coated onto the uncured first coloring coating film using a rotary atomizing electrostatic coater to a dry film thickness of 15 μm, and allowed to stand for 5 minutes. The clear coating material (Z-1) obtained in Production Example 18 was electrostatically coated onto the second coloring coating film to a dry film thickness of 35 μm, and allowed to stand for 7 minutes. It was then heated at 80° C. for 30 minutes to heat and cure the first coloring coating film, second coloring coating film and clear coating film, to prepare each test sheet.

Examples 3 to 15 and Comparative Examples 1 to 10

A test sheet was fabricated in the same manner as Example 1, except that in Example 1, the type of first coloring coating material (X-1), second coloring coating material (Y-1) and clear coating material (Z-1) and the heat curing temperature were changed as shown in Table 2.

Each of the obtained test sheets was evaluated by the following test methods. The evaluation results are shown in Table 2.

(Test Method)

Chipping resistance: The test sheet was set on the sample holding stage of a Model JA-400 chipping tester (trade name of Suga Test Instruments Co., Ltd., chipping resistance tester), and 50 g of crushed granite of #7 grain size was impacted onto the test sheet at an angle of 45°, using compressed air at 0.39 MPa (4 kgf/cm$^2$), at −20° C. at a distance of 30 cm from the test sheet. The obtained test sheet was then washed with water and dried, and cloth adhesive tape (product of Nichiban Co., Ltd.) was attached to the coating surface and peeled off, after which the extent of damage in the coating film was visually examined and evaluated on the following scale.

VG: Very small damage size, no exposure of electrodeposition surface or base steel sheet.

G: Small damage size, no exposure of electrodeposition surface or base steel sheet.

F: Small damage size, but some exposure of electrodeposition surface or base steel sheet.

P: Considerable damage size, with exposure of base steel sheet.

Waterproof adhesiveness: The test sheet was immersed in hot water at 40° C. for 240 hours and then raised up and dried at 20° C. for 12 hours. Following the procedure specified by JIS K 5600-5-6(1990), a 2 mm×2 mm 100-square grid was formed in the coated film on the test sheet, adhesive tape was attached to the surface, and after abruptly peeling it off, the number of squares of the coated film remaining on the surface was evaluated.

VG: Remaining squares/total squares=100/100 with no edge chipping

G: Remaining squares/total squares=100/100 with edge chipping

F: Remaining squares/total squares=99-90/100

P: Remaining squares/total squares=≤89/100

Finished appearance: The smoothness of each test sheet was evaluated based on the Long Wave (LW) value measured with a "Wave Scan" (trade name of BYK Gardner), and the distincness was evaluated based on the Short Wave (SW) value. A smaller LW value indicates higher smoothness of the coating surface, and a smaller SW value indicates higher distincness of the coating surface.

TABLE 2

|  |  | First coloring coating material (X) | Second coloring coating material (Y) | Clear coating material (Z) | Heat curing temperature (° C.) | Evaluation results | | | |
|---|---|---|---|---|---|---|---|---|---|
|  |  |  |  |  |  | Chipping resistance | Waterproof adhesiveness | Finished appearance | |
|  |  |  |  |  |  |  |  | Smoothness (LW) | Distincness (SW) |
| Example | 1 | X-1 | Y-1 | Z-1 | 80 | VG | VG | 6 | 7 |
|  | 2 | X-3 | Y-2 | Z-1 | 80 | VG | VG | 7 | 6 |
|  | 3 | X-2 | Y-1 | Z-1 | 80 | G | VG | 7 | 7 |
|  | 4 | X-1 | Y-1 | Z-2 | 80 | VG | VG | 6 | 5 |
|  | 5 | X-1 | Y-1 | Z-3 | 80 | VG | VG | 6 | 6 |
|  | 6 | X-1 | Y-1 | Z-3 | 70 | VG | VG | 5 | 6 |
|  | 7 | X-1 | Y-1 | Z-3 | 90 | VG | VG | 6 | 6 |

TABLE 2-continued

|  |  | First coloring coating material (X) | Second coloring coating material (Y) | Clear coating material (Z) | Heat curing temperature (° C.) | Evaluation results | | | |
|---|---|---|---|---|---|---|---|---|---|
|  |  |  |  |  |  | Chipping resistance | Waterproof adhesiveness | Finished appearance | |
|  |  |  |  |  |  |  |  | Smoothness (LW) | Distinctness (SW) |
|  | 8 | X-1 | Y-1 | Z-3 | 100 | VG | VG | 6 | 6 |
|  | 9 | X-1 | Y-1 | Z-4 | 80 | VG | VG | 7 | 6 |
|  | 10 | X-1 | Y-1 | Z-5 | 80 | VG | VG | 6 | 6 |
|  | 11 | X-1 | Y-1 | Z-6 | 80 | VG | VG | 6 | 6 |
|  | 12 | X-1 | Y-1 | Z-7 | 80 | VG | G | 6 | 6 |
|  | 13 | X-1 | Y-1 | Z-8 | 80 | VG | VG | 5 | 6 |
|  | 14 | X-1 | Y-1 | Z-9 | 80 | VG | VG | 6 | 5 |
|  | 15 | X-1 | Y-1 | Z-10 | 80 | VG | VG | 7 | 6 |
| Comp. Example | 1 | X-1 | Y-1 | Z-11 | 80 | F | P | 12 | 12 |
|  | 2 | X-1 | Y-1 | Z-12 | 80 | G | P | 12 | 12 |
|  | 3 | X-1 | Y-1 | Z-13 | 80 | F | P | 13 | 12 |
|  | 4 | X-1 | Y-1 | Z-14 | 80 | F | P | 7 | 9 |
|  | 5 | X-1 | Y-1 | Z-15 | 80 | G | P | 11 | 12 |
|  | 6 | X-1 | Y-1 | Z-16 | 80 | P | P | 13 | 13 |
|  | 7 | X-1 | Y-1 | Z-17 | 80 | F | F | 14 | 13 |
|  | 8 | X-1 | Y-1 | Z-18 | 80 | F | F | 14 | 14 |
|  | 9 | X-1 | Y-1 | Z-19 | 80 | F | F | 8 | 8 |
|  | 10 | X-1 | Y-1 | Z-20 | 80 | F | P | 12 | 13 |

The invention claimed is:

1. A method for forming a multilayer coating film in which the following steps (1) to (4) are carried out in order on an article to be coated:
   step (1): applying a first coloring coating material (X) onto an article to be coated to form a first coloring coating film,
   step (2): applying a second coloring coating material (Y) onto the first coloring coating film formed in step (1), to form a second coloring coating film,
   step (3): applying a clear coating material (Z) onto the second coloring coating film formed in step (2) to form a clear coating film, and
   step (4): heat curing the first coloring coating film, the second coloring coating film and the clear coating film formed in steps (1) to (3) all at once,
   wherein:
   the first coloring coating material (X) contains a hydroxyl group-containing resin (x1), the second coloring coating material (Y) contains a hydroxyl group-containing resin (y1), the clear coating material (Z) contains a hydroxyl group-containing acrylic resin (a) and a polyisocyanate compound (b), and the polyisocyanate compound (b) contains an aliphatic triisocyanate compound (b1) with a molecular weight in the range of 200 to 350, and a polyisocyanate compound (b2) with a molecular weight in the range of 500 to 2000, wherein the content ratio of the aliphatic triisocyanate compound (b1) and the polyisocyanate compound (b2) is (b1)/(b2)=5/95 to 99/1, as the mass ratio of the aliphatic triisocyanate compound (b1)/polyisocyanate compound (b2),
   the aliphatic triisocyanate compound (b1) comprises an aliphatic triisocyanate compound selected from the group consisting of 1,8-diisocyanato-4-isocyanatomethyloctane, 2-isocyanatoethyl (2S)-2,6-diisocyanatohexanoate (common name: lysine triisocyanate), 2-isocyanatoethyl 2,6-diisocyanatohexanoate, 1,6,11-triisocyanatoundecane, and the combinations thereof; and
   the polyisocyanate compound (b2) comprises an aliphatic diisocyanate compound or a derivative thereof.

2. The method for forming a multilayer coating film according to claim 1, wherein the first coloring coating material (X) further contains a flat pigment.

3. The method for forming a multilayer coating film according to claim 1, wherein the first coloring coating material (X) and/or the second coloring coating material (Y) further contain a blocked polyisocyanate compound.

4. The method for forming a multilayer coating film according to claim 1, wherein the first coloring coating material (X) and the second coloring coating material (Y) are aqueous coating materials.

5. The method for forming a multilayer coating film according to claim 1, wherein the proportion of the aliphatic triisocyanate compound (b1) in the polyisocyanate compound (b) of the clear coating material (Z) is in the range of 10 to 60 mass %.

6. The method for forming a multilayer coating film according to claim 1, wherein the equivalent ratio (NCO/OH) between the total moles of isocyanate groups of the polyisocyanate compound (b) and the total moles of hydroxyl groups of the hydroxyl group-containing acrylic resin (a) in the clear coating material (Z) is in the range of 1.3 to 2.5.

7. The method for forming a multilayer coating film according to claim 1, wherein the heating temperature in step (4) is in the range of 60° C. to 120° C.

8. The method for forming a multilayer coating film according to claim 1, wherein the content ratio of the aliphatic triisocyanate compound (b1) and the polyisocyanate compound (b2) is (b1)/(b2)=10/90 to 60/40, as the mass ratio of the aliphatic triisocyanate compound (b1)/polyisocyanate compound (b2).

\* \* \* \* \*